US012260709B2

(12) United States Patent
Palmisano et al.

(10) Patent No.: US 12,260,709 B2
(45) **Date of Patent: *Mar. 25, 2025**

(54) ELECTRONIC GAMING SYSTEM FOR CONDUCTING A WAGERING GAME AND METHOD OF USE

(71) Applicant: Aristocrat Technologies Australia Pty Limited, North Ryde (AU)

(72) Inventors: Angelo Palmisano, Las Vegas, NV (US); Keith A. Wood, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/047,246

(22) Filed: Oct. 17, 2022

(65) Prior Publication Data

US 2023/0113797 A1 Apr. 13, 2023

Related U.S. Application Data

(63) Continuation of application No. 17/317,236, filed on May 11, 2021, now Pat. No. 11,475,738, which is a (Continued)

(51) Int. Cl.
*G07F 17/32* (2006.01)

(52) U.S. Cl.
CPC ...... *G07F 17/3276* (2013.01); *G07F 17/3209* (2013.01); *G07F 17/3211* (2013.01);
(Continued)

(58) Field of Classification Search
CPC ............. G07F 17/3276; G07F 17/3209; G07F 17/3211; G07F 17/3239; G07F 17/3244; G07F 17/326
(Continued)

(56) References Cited

U.S. PATENT DOCUMENTS 7,824,267 B2 11/2010 Cannon
8,702,520 B2 4/2014 Seelig
(Continued)

FOREIGN PATENT DOCUMENTS

WO 2002027676 A2 4/2002

OTHER PUBLICATIONS

Australian Examination Report No. 2 issued in App. No. AU2021212157, dated Oct. 5, 2023, 3 pages.
(Continued)

*Primary Examiner* — Ryan Hsu
(74) *Attorney, Agent, or Firm* — Armstrong Teasdale LLP

(57) ABSTRACT

An electronic gaming machine includes a game display having a graphical user interface (GUI). A game controller is in communication with the game display. The game controller controls the GUI to present a selectable tournament button that causes the player to enter a game tournament, displays a plurality of selectable tournament game options for the game tournament, receives a tournament game selection response indicating a selected one of the options, displays the selected tournament game, displays at the GUI during the selected tournament game, an exit button that returns the display to the base game and maintains player progress in the selected tournament game, re-displays the tournament button upon returning to the base game, the re-displayed tournament button enables the player to return to the selected tournament game with the maintained player progress, and displays a prompt to card-in, and provide an enhanced return to player (RTP).

17 Claims, 18 Drawing Sheets

Related U.S. Application Data continuation of application No. 17/025,693, filed on Sep. 18, 2020, now Pat. No. 11,030,858, which is a continuation of application No. 15/713,196, filed on Sep. 22, 2017, now Pat. No. 10,789,814.

(60) Provisional application No. 62/399,883, filed on Sep. 26, 2016.

(52) U.S. Cl.
CPC ...... *G07F 17/3239* (2013.01); *G07F 17/3244* (2013.01); *G07F 17/326* (2013.01)

(58) Field of Classification Search
USPC ........................................................... 463/25
See application file for complete search history.

(56) References Cited

U.S. PATENT DOCUMENTS

| | | | | |
|---|---|---|---|---|
| 9,520,020 | B2 | 12/2016 | Bickley | |
| 2002/0039923 | A1 | 4/2002 | Cannon | |
| 2002/0183105 | A1 | 12/2002 | Cannon | |
| 2003/0186745 | A1 | 10/2003 | Nguyen | |
| 2006/0178202 | A1 | 8/2006 | Hughes | |
| 2008/0254883 | A1* | 10/2008 | Patel .................. | G07F 17/3276 463/31 |
| 2010/0029381 | A1* | 2/2010 | Vancura ............. | G07F 17/3267 463/30 |
| 2010/0311497 | A1 | 12/2010 | Suslik | |
| 2011/0014964 | A1 | 1/2011 | Crowder, Jr. | |
| 2011/0077071 | A1 | 3/2011 | Decasa | |
| 2012/0264505 | A1 | 10/2012 | Anderson | |
| 2013/0217480 | A1 | 8/2013 | Decasa, Jr. | |
| 2014/0162787 | A1 | 6/2014 | Carpenter | |
| 2017/0084127 | A1 | 3/2017 | Lark | |
| 2017/0200349 | A1 | 7/2017 | Englman | |

OTHER PUBLICATIONS

Australian Office Action issued in AU2019201140, dated Apr. 15, 2020, 2 pages.
Notice of Allowance dated Jun. 24, 2020 for U.S. Appl. No. 15/713,196 (pp. 1-5).
Office Action dated Nov. 12, 2020 for U.S. Appl. No. 17/025,693 (pp. 1-15).
Notice of Allowance dated Feb. 19, 2021 for U.S. Appl. No. 17/025,693 (pp. 1-9).
Office Action (Notice of Allowance and Fees Due (PTOL-85)) dated Jul. 7, 2022 for U.S. Appl. No. 17/317,236 (pp. 1-10).
Australian Examination Report No. 1 issued in App. No. AU2021212157, dated Oct. 10, 2022, 3 pages.
Australian Examination Report No. 1 issued in App. No. AU2023248092, dated Aug. 1, 2024, 3 pages.

* cited by examiner

800

FIG. 17
1700
G2E 2016
Winnabunch
CASINO
$25,000
TOURNAMENT
LEADERBOARD
RANK
1ST PLACE
2ND PLACE $5,000 Lawrence T. 99,123,456,789
3RD PLACE $2,500 Elizabeth G. 89,123,456,789
4TH PLACE $1,500 Samantha O. 79,123,456,789
5TH PLACE $1,000 Michelle M. 69,123,456,789
6TH PLACE $7500 Christopher R. 59,123,456,789
7TH PLACE $500 Stephanie B. 49,123,456,789

1800

ELECTRONIC GAMING SYSTEM FOR CONDUCTING A WAGERING GAME AND METHOD OF USE

CROSS REFERENCE TO RELATED APPLICATIONS

This application is a Continuation of U.S. patent application Ser. No. 17/317,236, filed May 11, 2021, which is a Continuation of U.S. patent application Ser. No. 17/025,693, now U.S. Pat. No. 11,030,858, filed Sep. 18, 2020, which is a Continuation of U.S. patent application Ser. No. 15/713,196, now U.S. Pat. No. 10,789,814, filed Sep. 22, 2017, which claims priority to U.S. Provisional Patent Application No. 62/399,883 filed on Sep. 26, 2016, the disclosures of each of which are hereby incorporated by reference herein in their entireties.

TECHNICAL FIELD

The embodiments described herein relate generally to electronic gaming systems and methods conducting wagering games and, more particularly, to an electronic gaming system for conducting a tournament and for providing multiple games.

BACKGROUND

Generally, many known electronic gaming machines conduct wagering games, such as, for example, reel games, or slots. In such games, symbols are randomly selected and displayed in a matrix of symbols on a game display. The wagering game defines one or more win conditions, the occurrence of which results in a win amount being awarded. Typically, reel games define win conditions as win-lines defined across at least a portion of the matrix on the game display. For each round of play, when a certain combinations of symbols appear along a win-line, the reel game awards a win amount, or winnings, corresponding to that combination of symbols and that win-line. Win amounts vary according to the combination of symbols and according to the particular win-line along which the combination of symbols appears. Win amounts are typically determined according to a pay table defined for the wagering game, where the pay table comprehends the various combinations of symbols and win-lines, i.e., the win conditions that may occur in the wagering game. In many reel games, the win amount for a round of play may be a fraction of an amount wagered for that round of play for certain win conditions. For other win conditions, the win amount may be much larger than the amount wagered.

Generally, many known electronic gaming machines provided a certain predetermined RTP when measured over many rounds of play of a given electronic game. RTP is defined as a percentage of an amount wagered over the course of a large sample of rounds of play. For example, an RTP of 15% of credits wagered in a particular electronic game may indicate that over the course of 1000 rounds of play of that particular game, the electronic game will award 15% of all credits wagered in those 1000 rounds of play back to the one or more players who played those 1000 rounds of play. The precise RTP percentage and number of rounds of play that constitute a large sample varies from game-to-game, and casino-to-casino. A particular RTP for an electronic game may not hold true for a small number of rounds of play of the electronic game. For example, a player wagering 100 credits over the course of 10 rounds of play of a particular electronic game having a 15% RTP will not necessarily be awarded 15 credits over those 10 rounds of play. The actual RTP may vary greatly from the set RTP over a mere 10 rounds of play.

RTP is generally a composite property of a particular electronic game, combining the effects of payouts in a base game, payouts in a feature game, and frequency at which bonus games are awarded. Conventionally, many electronic gaming machines are configured by a gaming establishment, or casino, to have a certain RTP. Such configurations produce consistent RTP over the course of many players, many rounds of play, and all levels of wagering.

Many wagering games, such as slots, for example, are offered by casinos in the form of tournaments. Tournaments are popular with players, but require additional systems be utilized by the offering casino. For example, players are registered and tracked throughout the tournament, which is typically carried out in real-time by a player tracking system or tournament management system. Typically, a casino organizes a tournament for a fixed duration on a given date and time. The casino invites players and designates particular electronic gaming machines for use in the tournament. The designated electronic gaming machines are configured for the tournament and are unavailable for base game play until after the tournament is complete. During tournament play, players play as quickly as possible until the duration expires.

Many known electronic gaming machines include bonus features that, when triggered, result in an additional award, or bonus award, to the player. Such bonus features are incorporated into many wagering games to enhance the electronic gaming machines through additional elements of excitement and chance. Moreover, many loyalty club members demand more from the gaming establishments and casinos based on their standing in the loyalty club and based on their gameplay. Accordingly, gaming establishments and casinos have a continuous need to provide a richer experience with exclusive graphics, exclusive gameplay characteristics, and improved pay tables.

BRIEF DESCRIPTION

In one aspect, an electronic gaming machine is provided, including a player interface, a meter, a game display, and a game controller. The electronic gaming machine provides a multi-game feature in which various subgames having varying configurations are available. The electronic gaming machine determines whether a given player is eligible to participate in the various subgames based on one or more criteria.

In another aspect, a gaming system is provided, including a tournament management system and a plurality of electronic gaming machines. Each electronic gaming machine provides a base game during which a player wagers monetary currency and may earn winnings, bonuses, and perks that are redeemable monetarily or non-monetarily. The player also may be provided an access to a tournament during which non-monetary currency, i.e., virtual currency, is wagered and virtual winnings may be earned. Moreover, during the tournament, additional perks and bonuses may be earned. The player may participate in the tournament as desired until their virtual currency is exhausted. The player may, at his discretion, exit tournament play to resume play of the base game, during which additional winnings may be earned, as well as additional perks and bonuses to be redeemed in the tournament. The player may, again, enter tournament play or may be granted access to another tournament.

BRIEF DESCRIPTION OF THE DRAWINGS

The embodiments described herein may be better understood by referring to the following description in conjunction with the accompanying drawings.

DETAILED DESCRIPTION

Figure 1:
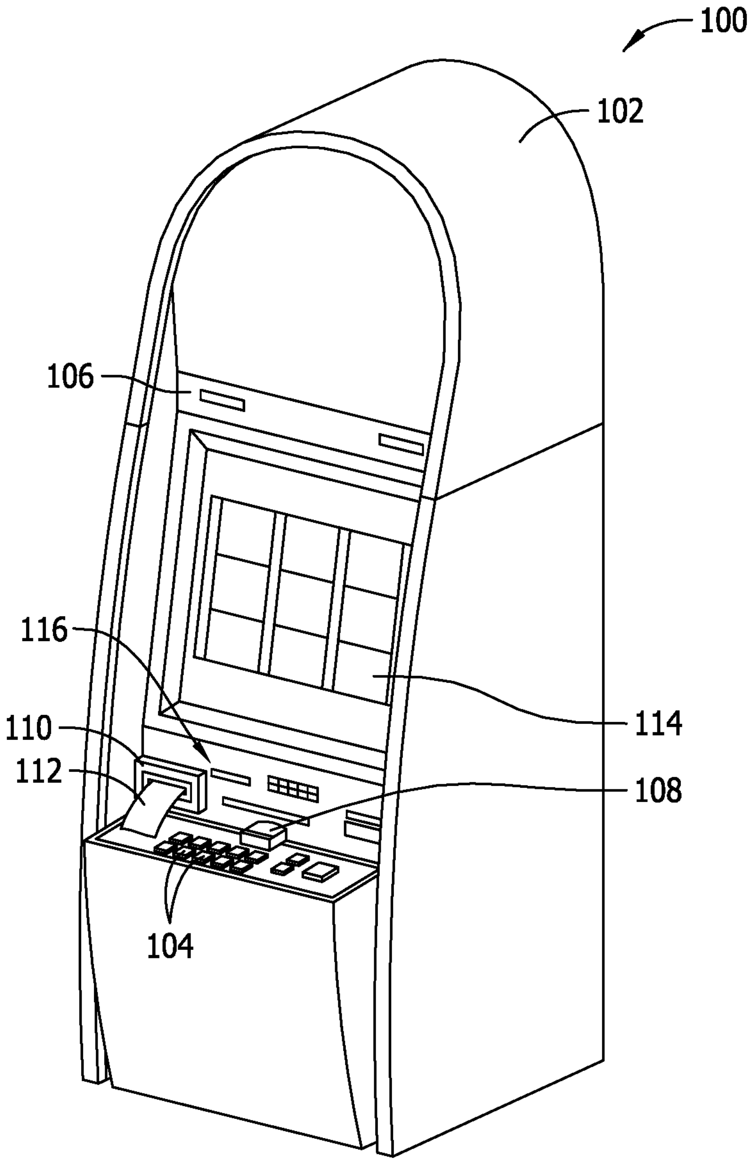
FIG. 1 is a perspective diagram of an exemplary electronic gaming machine.

According to embodiments of the present disclosure, gaming systems, electronic gaming machines, and methods of conducting wagering games are described herein. The gaming systems, electronic gaming machines, and methods described herein enable the implementation of a wagering game that includes a multi-game feature. The multi-game feature generally enables an electronic gaming machine to host multiple wagering games, also referred to as subgames. The multiple subgames are made available to a player through a menu system that is independent of each individual subgame. The menu system is sometimes referred to as part of the gaming "platform" rather than the game system. Each game typically represents a collection of assets, game mechanics, and a pay table. Typically, the platform hosts the various subgames, each having its own gameplay experience and pay table. The platform receives a selection of a subgame from the player and reports to the game system which subgames are available. During play, the platform also reports game play to the game system, such as, for example, the player tracking system or tournament management system in real-time or near-real-time. The game system maintains configuration data for each of the various subgames hosted by the platform. The game system records game play data that is reported from the platform, records player data, including, for example, earnings, reinvestments, points, "comps," and other loyalty features based on wagers made by the player. The game system may further provide comparative and analytic reporting for subgames and electronic gaming machines to identify high-performing games and individual player preferences.

It is realized herein the multi-game feature may be improved. In such embodiments, the game system organizes available subgames by a configurable parameter, such as, for example, RTP. In such an embodiment, each available subgame offers an incremental increase in RTP. Further, such embodiments define criteria to grant a player access to the various subgames. Such criteria may include recent wager amounts, credit balances, loyalty club membership, loyalty club tier, e.g., silver, gold, platinum. It is further realized herein the platform receives a message, rather than a player selection, from the game system that indicates which subgame is to be played based on the player's criteria. It is further realized herein the game system stores an ordinal ranking of subgames based on their configurable parameter, such as RTP, for example, and further stores the criteria for player access. When a player inserts a player card, i.e., "cards in," the game system determines if the player is eligible for access to a premium game. If so, the game system sends a message to the platform indicating the subgame to which the player has been granted access. When the player session is terminated, the game system sends a message to the platform indicating a default subgame.

Tournaments may be managed, configured, and organized using an interface for a group of electronic gaming machines to be used in a given tournament. Tournaments may be implemented for slots and any other suitable wagering game. A tournament management system allows tournament organizers to set tournament names, dates, and overall rule structure. More specifically, the tournament management system enables configuration of entry status, number of sessions, length of sessions, number of players, and payout structure. The tournament management system further enables perks that players may earn while participating in wagering games on certain electronic gaming machines. During tournament play, players may earn bonuses, rewards, or other perks that may be used in tournament play, base game play, or both.

In a typical tournament, the casino determines a small number of players to be invited into the player group. The casino then establishes a brief duration of time during which the tournament is conducted. For example, the casino may set a 10 minute duration on a particular day. Invitations are sent to the player group and the tournament is held on the established day. For the tournament, the casino designates, for example, by roping-off, electronic gaming machines for the tournament. The electronic gaming machines are configured for the tournament, which may include disabling certain features, such as, for example, bonus features. During play, each player in the player group selects one of the designated electronic gaming machines and the tournament begins. The beginning of the tournament may be signaled by a verbal announcement. Typically, because the tournament is a time-limited event, players play as quickly as possible, activating the "spin" button without even paying attention to the outcomes as they occur. When the tournament duration expires, which may be another verbal announcement, tournament play is stopped and the tournament is ended. Typically, tournament players do not keep the winnings from tournament play, although monetary payouts may be awarded to top players from the player group.

It is realized herein the tournaments bring players into casinos, rewards certain players, and improves revenue. It is further realized herein the electronic gaming machines are unnecessarily unavailable to players outside the player group. It is realized herein the number of players that can participate in the tournament is limited due to the need to "rope-off" electronic gaming machines. Moreover, it is realized herein, the tournaments bring players to the casino only on certain days when the tournament is conducted, and further is limited to the times before and after the short-duration tournament. Consequently, players may be discouraged from participating in short tournaments without winning. It is further realized herein that players are typically unable to select which game they prefer to play in the tournament.

It is realized herein that tournaments may persist over multiple game sessions, on multiple wagering games, on multiple electronic gaming machines, and across multiple gaming establishments. It is realized herein that a persistent tournament may be carried out over an indefinite amount of time. Such tournaments are hosted along with any suitable base game. The base game is conducted using wagers of monetary currency. The base game may award winnings, bonuses, and perks. Further, during the base game, players are awarded loyalty points based on their amount of "coin-in" into the base game. The tournament is conducted using wagers in loyalty points, i.e., a virtual currency. The tournament outcome is determined based on accumulated loyalty points. Additionally, in certain embodiments, bonus features, perks, or "boost" features may be earned by the player during the base game for redemption in the tournament. For example, a player may earn a multiplier feature in the base game that is redeemable during tournament play. A multiplier booster, when played, multiplies credits awarded in a subsequent game round. Boosters may include a score booster wherein additional credits are awarded to the player. Boosters may include a time booster that, in certain embodiments, awards additional free spins, thus awarding additional tournament time.

It is realized herein, in persistent tournaments, the player may participate in tournament play on one or more electronic gaming machine and on one or more gaming establishment. It is further realized herein, that players may participate in tournament play "off-property" due to the non-monetary nature of the tournament. Players may leave a casino and participate in the tournament using a smart phone, tablet, PC, or other suitable computing device. When a player exhausts the virtual currency in the tournament, the player returns to the casino to play in a base game to earn additional virtual currency, such as, for example, loyalty points. Likewise, during play at a casino, a player moves between the base game and tournament play at their discretion. For example, a player may select, during the base game, an option to play in the tournament. Likewise, the player may select, during the tournament, an option to play in the base game. Conversely, traditional tournament play is not based on loyalty points. Rather, in traditional tournament play, the electronic gaming machine is manually "keyed out" from monetary currency, or "revenue," and "keyed in" to revenue when the tournament is ended.

The electronic gaming machines described herein may be embodied in various configurations, including, for example, and without limitation (1) an electronic gaming machine in which the computer-executable instructions for controlling one or more wagering games are stored within the electronic gaming machine prior to installation at a gaming establishment, e.g., at the factory, and (2) a configurable gaming machine in which the computer-executable instructions for controlling one or more wagering games are subsequently downloaded to the electronic gaming machine over a network after the electronic gaming machine is installed at the gaming establishment. Such configurations are referred to as "thick clients" in that the computer-executable instructions for controlling the one or more wagering games are stored in local memory and executed by a local processor, or game controller to conduct the one or more wagering game and to control the various interfaces of the electronic gaming machine. In alternative embodiments, computer-executable instructions for controlling one or more wagering games are executed by a game server, central game controller, or a remote host. Such embodiments are referred to as "thin clients" in that the game server remotely controls the one or more wagering games and certain interfaces over a network, and the electronic gaming machine displays the wagering games and provides interfaces to receive player inputs and commands.

FIG. 1 is a schematic diagram of an exemplary electronic gaming machine 100. Electronic gaming machine 100 may be any type of gaming machine, and may include, without limitation, different structures than those shown in FIG. 1, such as, for example, a personal computer, tablet computer, smart phone, personal digital assistant (PDA), cellular phone, and any other network-enabled device. Moreover, electronic gaming machine 100 may employ different methods of operation than those described below.

In the exemplary embodiment, electronic gaming machine 100 includes a cabinet 102 that houses a plurality of components, such as a gaming machine controller, peripheral devices, displays, and/or player interaction devices. For example, in an exemplary embodiment, electronic gaming machine 100 includes a plurality of user interfaces, or input devices, such as switches and/or buttons 104 that are coupled to a front 106 of cabinet 102. Buttons 104 may be used to start play of a primary or secondary game. One button 104 may be a "Bet One" button that enables the player to place a bet or to increase a bet. Another button 104 may be a "Bet Max" button that enables the player to bet a maximum permitted wager. Yet another button 104 may be a "Cash Out" button that enables the player to receive a cash payment or other suitable form of payment, such as a ticket or voucher that corresponds to a number of remaining credits. User interfaces, in certain embodiments, include one or more touch screens as user interfaces.

In the exemplary embodiment, electronic gaming machine 100 also includes a credit input device 116. Credit input device 116 may include a coin acceptor 108 for accepting coins and/or tokens, a bill acceptor 110 for accepting and/or validating cash bills, coupons, and/or ticket vouchers 112. Bill acceptor 110 may also be capable of printing tickets 112. Furthermore, in some embodiments, credit input device 116 includes a card reader or a validator for use with credit cards, debit cards, identification cards, and/or smart cards. Cards accepted by the card reader or validator may include a magnetic strip and/or a preprogrammed microchip that includes a player's identification, credit totals, and any other relevant information that may be used. In certain embodiments, credit input device 116 may include a credit input module that interfaces with a server to accept credit and wagers.

Moreover, in the exemplary embodiment, electronic gaming machine 100 includes one or more displays 114. Displays 114 are mounted to cabinet 102, and may include a primary display for displaying a primary game and a secondary display for displaying a secondary or bonus game. Displays 114 may be further configured to display credit balances, wager amounts, cumulative wagering information, payout amounts, and RTP information. Displays 114 may include, without limitation, a plasma display, a liquid crystal display (LCD), a display based on light emitting diodes (LEDs), organic light emitting diodes (OLEDs), polymer light emitting diodes (PLEDs), and/or surface-conduction electron emitters (SEDs), a speaker, an alarm, and/or any other device capable of presenting information to a user. Displays 114 may include displays utilizing a projected or reflected image, or any other suitable electronic device or display mechanism. Displays 114 may be of any suitable size and configuration, including, for example, and without limitation, circular and rectangular. Displays 114 may further include a haptic feedback mechanism.

Displays 114, in various embodiments, display a wagering game and/or accept game play data from a player. Moreover, displays 114 may display information relating to an interactive game, a wager-triggering event, or a wagering outcome. Displays 114 may, in certain embodiments, display digital signage, including, for example, advertisements for one or more games or other aspects of the gaming establishment or casino.

Figure 2:
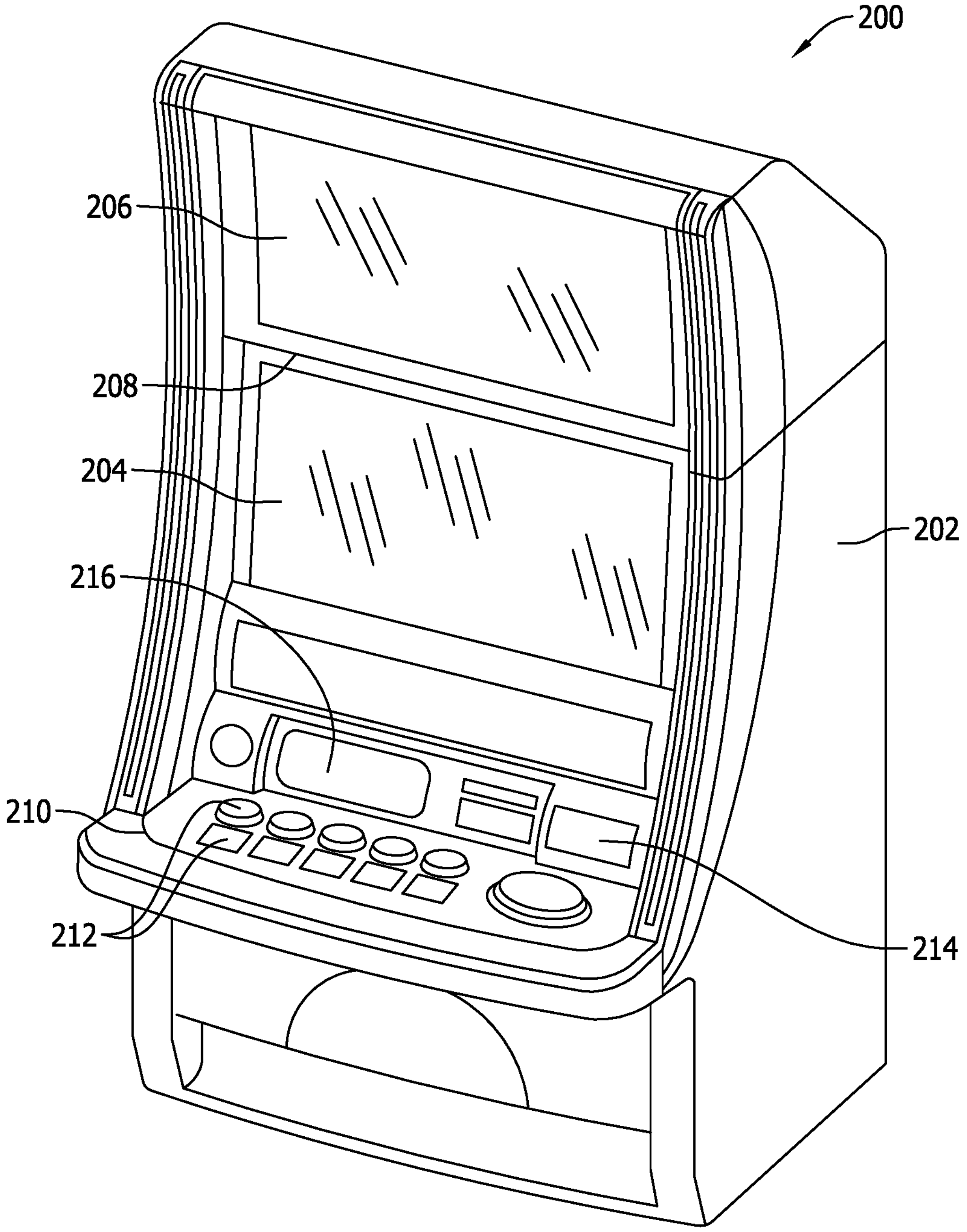
FIG. 2 is a perspective diagram of another exemplary electronic gaming machine.

With reference now to FIG. 2, another exemplary electronic gaming machine 200 is shown. Electronic gaming machine 200 includes a support structure, housing, console, or cabinet, herein referred to as a cabinet 202. Cabinet 202 provides structural support for various interfaces and displays, and, in certain embodiments, may be configured for operation by a standing or sitting player. Electronic gaming machine 200, in certain embodiments, is positioned on a base or stand. In alternative embodiments, electronic gaming machine 200 is configured as a table-top system. Electronic gaming machine 200 may include varying numbers and styles of cabinet 202 without departing from the scope of the present disclosure.

Cabinet 202 provides structural support for mounting a main video display 204 shown as a flat screen LCD, plasma, LED, OLED, PLED, SED. Moreover, main video display 204 may further include a touch screen display. Above main video display 204 is a secondary video display 206 that likewise is a flat screen LCD, plasma, LED, OLED, PLED, or SED display. In alternative embodiments, one or more of main video display 204 and secondary video display 206 may include a curved display. A mounting bezel 208 divides main display 204 from secondary display 206. A player interface, shown as a button panel 210, mounts a plurality of input buttons 212 through which a player controls an operation of a game. Below main video display 204 is an interface module 214 for interfacing with gaming machine 200, and a system interface display 216 for displaying system provided information (e.g., casino wide information and player points/comp data) to a player.

Main video display 204, in various embodiments, displays a wagering game and/or accepts game play data from a player. Moreover, main video display 204 may display information relating to an interactive game, a wager-triggering event, or a wagering outcome. Secondary video display 206 may, in certain embodiments, display digital signage, including, for example, advertisements for one or more games or other aspects of the gaming establishment or casino. Secondary video display 206 may be further configured to display wagering outcomes, secondary game data associated with or unassociated with the interactive wagering game displayed on main video display 204, and any information relating to such interactive wagering games. In certain embodiments, secondary video display 206 is further configured to receive inputs and commands from the player. Secondary video display 206, in certain embodiments, includes a credit or fund display that displays the player's current credit balance, cash accumulated, account balance, an original number of credits input to electronic gaming machine 200, or any other credit- or wager-related information. In certain embodiments, secondary video display 206 displays a wager amount for a current round of play. Secondary video display 206 may be further configured to display the player's winnings and bonus awards for the current round of play, as well as accumulated winnings and/or bonus awards.

Main video display 204 is configured to display at least one game or game image, game symbol or symbols, and game indicia, such as, for example, visual representations or exhibitions of movement of objects, including, for example, any mechanical, virtual, or video reels and wheels, dynamic lighting, video images, images of people, characters, places, things, and faces of cards. In certain embodiments, the symbols, images, and indicia are displayed mechanically on one or more mechanical reels. Such mechanical reels include an electromechanical device, such as one or more rotatable or spinning wheels, reels, or dice, any of which is configurable to display one or more games, images, symbols, or indicia. In other embodiments, the symbols, images, and indicia are display electronically, or virtually, on main video display 204.

Figure 3:
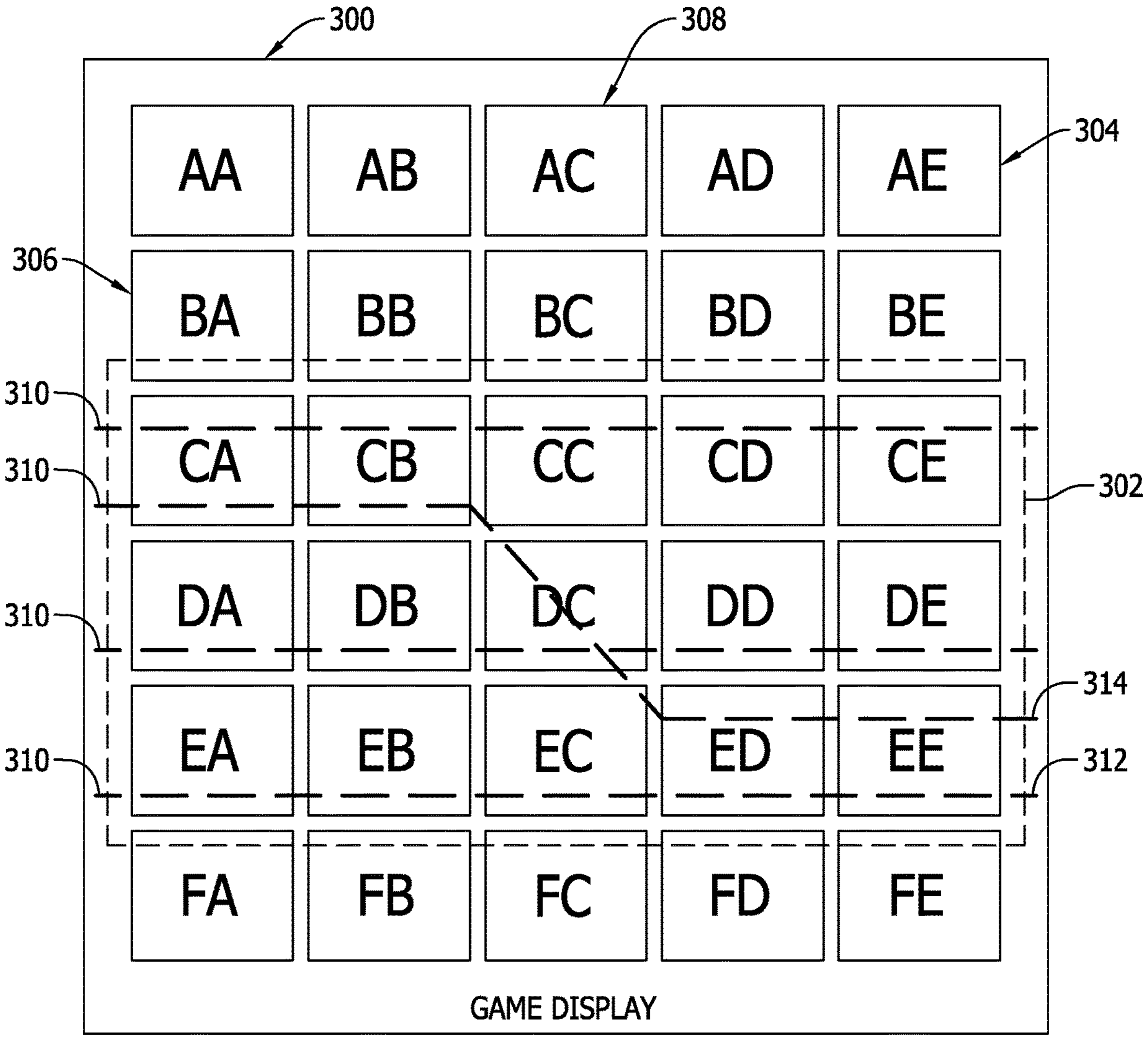
FIG. 3 is an illustrative diagram of an exemplary game display.

FIG. 3 is an illustrative diagram of a game display.

Figure 4:
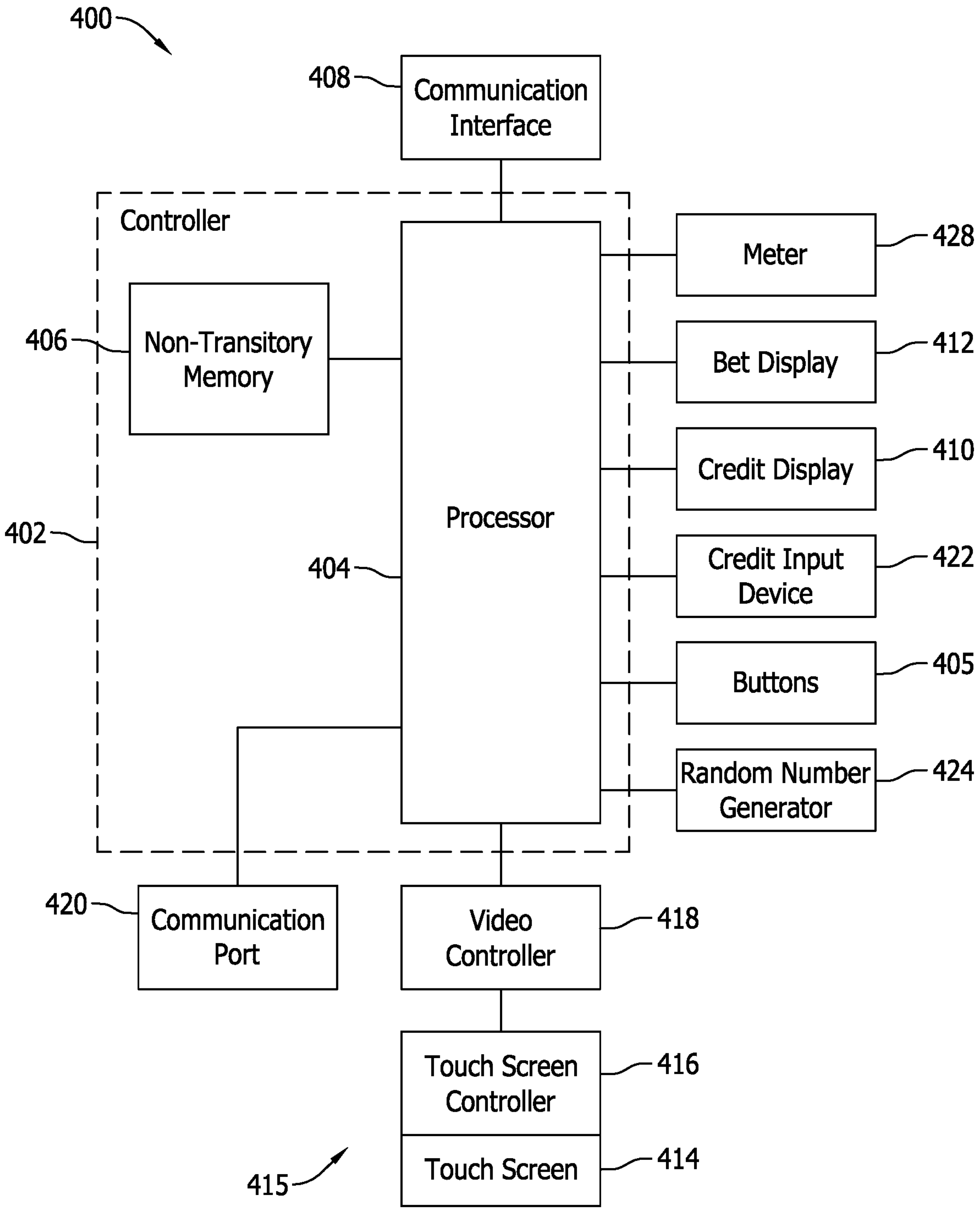
FIG. 4 is a schematic diagram of an exemplary electronic gaming machine, such as the electronic gaming machines shown in FIGS. 1 and 2.

FIG. 4 is a schematic block diagram of an electronic gaming machine 400 that may be embodied in, for example, and without limitation, electronic gaming machine 100 or 200 (shown in FIGS. 1 and 2). In the exemplary embodiment, gaming machine 400 includes a gaming machine controller 402 having a processor 404 communicatively coupled to a non-transitory memory 406. Moreover, in the exemplary embodiment, processor 404 and non-transitory memory 406 reside within a cabinet, such as cabinet 102 (shown in FIG. 1) and may be collectively referred to herein as a "computer" or "controller." Electronic gaming machine 400 is configurable and/or programmable to perform one or more operations described herein by programming processor 404. For example, processor 404 may be programmed by encoding an operation as one or more executable instructions and providing the executable instructions in non-transitory memory 406.

Controller 402 communicates with one or more other electronic gaming machines 400 or other suitable devices via a communication interface 408. Communication interface 408 may operate as an input device (e.g., by receiving data from another device) and/or as an output device (e.g., by transmitting data to another device). Electronic gaming machine 400 includes one or more buttons 405, such as buttons 104 or buttons 212 shown in FIGS. 1 and 2. Processor 404 may be a microprocessor, a microcontroller-based platform, a suitable integrated circuit, and/or one or more application-specific integrated circuits (ASICs). However, the above examples are exemplary only, and thus are not intended to limit in any way the definition and/or meaning of the term "processor." Electronic gaming machine 400 includes a random number generator 424. In certain embodiments, random number generator 424 is integrated into controller 402 or processor 404. Random number generator 424 is configured to be secure from unauthorized access, manipulation, or compromise. Generally, an output of random number generator 424 is the basis on which game outcomes are determined by controller 402, and includes both random and pseudo random numbers.

In certain embodiments, data and the computer-executable instructions may be stored in a cloud service, a database, or other non-transitory memory accessible by electronic gaming machine 400. Such embodiments reduce the computational and storage burden on electronic gaming machine 400. As such, non-transitory memory 406 may be a local and/or a remote computer storage media including memory storage devices. Moreover, non-transitory memory 406 may include one or more forms of memory. For example, non-transitory memory 406 can include random access memory (RAM), read-only memory (ROM), flash memory, and/or electrically erasable programmable read-only memory (EEPROM). In some embodiments, other suitable magnetic, optical, and/or semiconductor-based memory may be included in non-transitory memory 406 by itself or in combination.

When games are implemented in an online environment, at least a portion of the game software is stored in a remote game server, or in a cloud computing service. Game transactions such as adding money to the game, i.e., cash in, and withdrawing money from the game, i.e., cash out, are substituted by implementing electronic fund transfers. Each player deposits money into his online gaming account via checks, debit cards, wire and the like. Once funded, the player can move a portion of the cash in his account into the game he wants to play. This process is referred to as account-based wagering. Account-based wagering is a convenient monetary transaction system for online and mobile wagering environments since the physical bill acceptor and ticket printer are not available. In addition to the accounting meters' separation requirement, the detection of the location where the wagering transaction take place is also required in order to enforce local gaming regulations and to properly calculate revenue, profit, and tax withholdings, for example.

Non-transitory memory 406, in certain embodiments, is a physical storage device, such as, for example, a cartridge that is removable from electronic gaming machine 400. Further, in certain embodiments, non-transitory memory 406 includes multiple removable physical storage devices, each configured to store certain executable program modules. In alternative embodiments, non-transitory memory 406 includes multiple partitions of a single physical storage device, each partition configured to store certain executable program modules.

Electronic gaming machine 400 includes a credit input device 422 for accepting various forms of money or credit. Credit input device 422 may include one or more of a coin acceptor, bill validator, ticket reader, or card reader, for example. In certain embodiments, credit input device 422 includes an interface to a server configured to accept credits to establish a credit balance at electronic gaming machine 400. Electronic gaming machine 400 further includes at least one meter 428 for tracking and recording gaming data, including, for example amounts wagered on electronic gaming machine 400.

Electronic gaming machine 400 includes a credit display 410 that displays a player's current number of credits, cash, account balance or the equivalent. Electronic gaming machine 400 also includes a bet display 412 that displays a player's amount wagered. Credit display 410 and bet display 412 may be standalone displays independent of a display 415, such as, for example, displays 114, main video display 204, or secondary video display 406, or credit display 410 and bet display 412 may be incorporated into display 415.

Moreover, in an exemplary embodiment, display 415 is controlled by controller 402. In some embodiments, display 415 includes a touch screen 414 and an associated touch screen controller 416. In such embodiments, display 415 may operate as an input device in addition to presenting information. A video controller 418 is communicatively coupled to controller 402 and touch screen controller 416 to enable a player to input game play decisions (e.g., actions on and selections of game presentation objects) into electronic gaming machine 400 via touch screen 414. Furthermore, electronic gaming machine 400 includes one or more communication ports 420 that enable controller 402 to communicate with external peripheral devices (not shown) such as, but not limited to, external video sources, expansion buses, other displays, a SCSI port, or a key pad.

Controller 402 selects symbols 304 that are displayed in matrix 302. Moreover, controller 402 determines whether a win condition exists and any win amounts that should be awarded to the player. Controller 402, in certain embodiments, selects a trigger symbol to be displayed in matrix 302. The trigger symbol corresponds to a multiplier feature that, when applied results in a multiple of winnings in the wagering being awarded and a multiple of the amount wagered being awarded.

Figure 5:
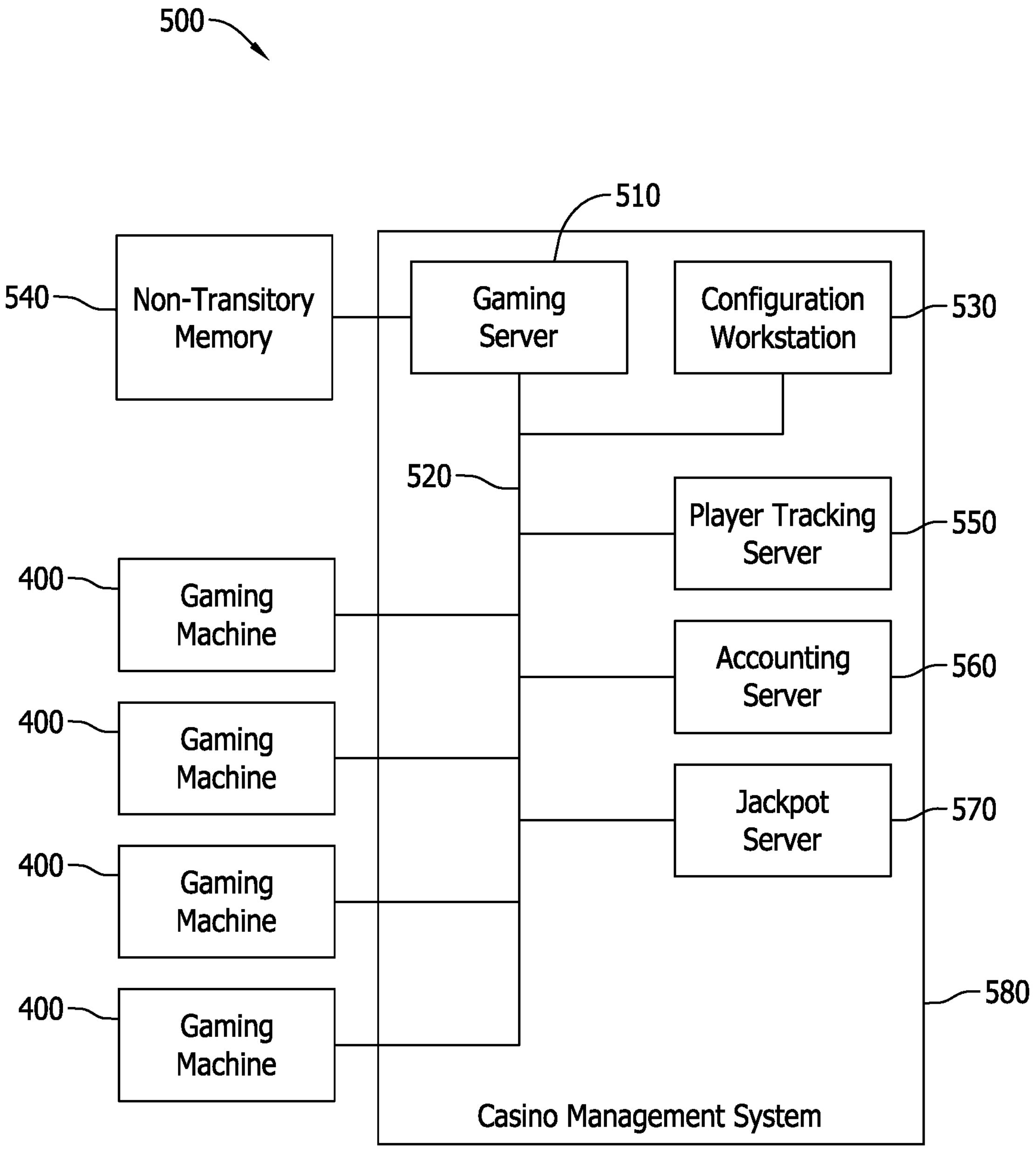
FIG. 5 is a block diagram of a gaming system in which the electronic gaming machines shown in FIGS. 1 and 2 may be embodied.

FIG. 5 is a block schematic diagram of an exemplary electronic gaming system 500 that includes a plurality of electronic gaming machines 400 (shown in FIG. 4). In alternative embodiments, electronic gaming system 500 may be implemented using electronic gaming machine 100 or 300 shown in FIGS. 1 and 2. Each gaming machine 400 is coupled via communication interface 408 (shown in FIG. 4) to one or more servers, such as a gaming server 510, using a network 520. In certain embodiments, gaming system 500 may include a player tracking server 550, an accounting server 560, and a bonus server 570. Gaming server 510, player tracking server 550, accounting server 560 and bonus server 570 combine to form a casino management system 580. Gaming server 510 may have an electrical architecture similar to that of electronic gaming machine 400. Gaming server 510 includes a processor (not shown) and a network interface, such as communication port 420 that facilitates data communication between gaming server 510, each gaming machine 400, and other components of gaming system 500. Such data is stored in, for example, a non-transitory memory 540, such as a database, that is coupled to gaming server 510.

Casino management system 580 includes a configuration workstation 530 coupled to server 510 and gaming machines 400 through network 520. In one embodiment, one or more gaming machines 400 may be remote gaming machines that access a casino via network 520. As such, a player is able to participate in a game of chance on a remote gaming machine. In such an embodiment, it will be understood that a player operating a remote gaming machine has virtual access to any casino coupled to network 520 and associated with gaming server 510. Gaming machines 400 may also be a personal computers coupled to the Internet via a virtual private network such that a player may participate in a game of chance, remotely. In other embodiments, the player may use a cell phone or other mobile devices (e.g., tablets, PDAs, laptops, and the like) coupled to a wired or wireless communication network to establish a connection with a particular casino. Moreover, gaming machines 400 may be terminal-based machines, such as, for example, electronic gaming machines 100 and 200, wherein the actual games, including random number generation and/or outcome determination, are performed at gaming server 510. In such an embodiment, gaming machines 400 display results of a game via displays 114, main video display 204, or secondary video display 206 (shown in FIGS. 1 and 2).

In one embodiment, gaming server 510 performs a plurality of functions including, game outcome generation, player tracking functions, and/or accounting functions, to name a few. For example, gaming server 510 may track data of players using gaming machines 400. For example, gaming server 510 can store physical characteristics of players, such as, but not limited to, a gender of a player and an age of a player. Gaming server 510 can also track and store other data related to the players using player tracking identification, such as a player card. For example, gaming server 510 can store information about a player, such as loyalty points, player address, phone number, and/or any information that may be retrieved and transmitted to gaming machines 400. In alternative embodiments, gaming system 500 may include a plurality of servers that separately perform these functions and/or any suitable function for use in a network-based gaming system.

Casino management system 580 includes at least one processor among gaming server 510, configuration workstation 530, player tracking server 550, accounting server 560, and bonus server 570. Casino management system 580 is coupled to gaming machines 400 over network 520. Casino management system 580 is configured to receive gaming data from gaming machines 400 as each of gaming machines 400 conducts various rounds of play of one or more wagering games.

A wagering game is carried out on at least one gaming machine 400, for example, by controller 402 (shown in FIG. 4). Controller 402 conducts the wagering game and generates gaming data. Gaming data may include, for example, wagers, game outcomes, payouts, player ratings, duration of play, and time between rounds of play. For each round of play of the wagering game, controller 402 conducts the wagering game and awards a payout, or win amount according to a pay table for electronic gaming machine 400. Further controller 402 is configured to apply a multiplier feature when a trigger symbol appears in matrix 302.

Figure 6:
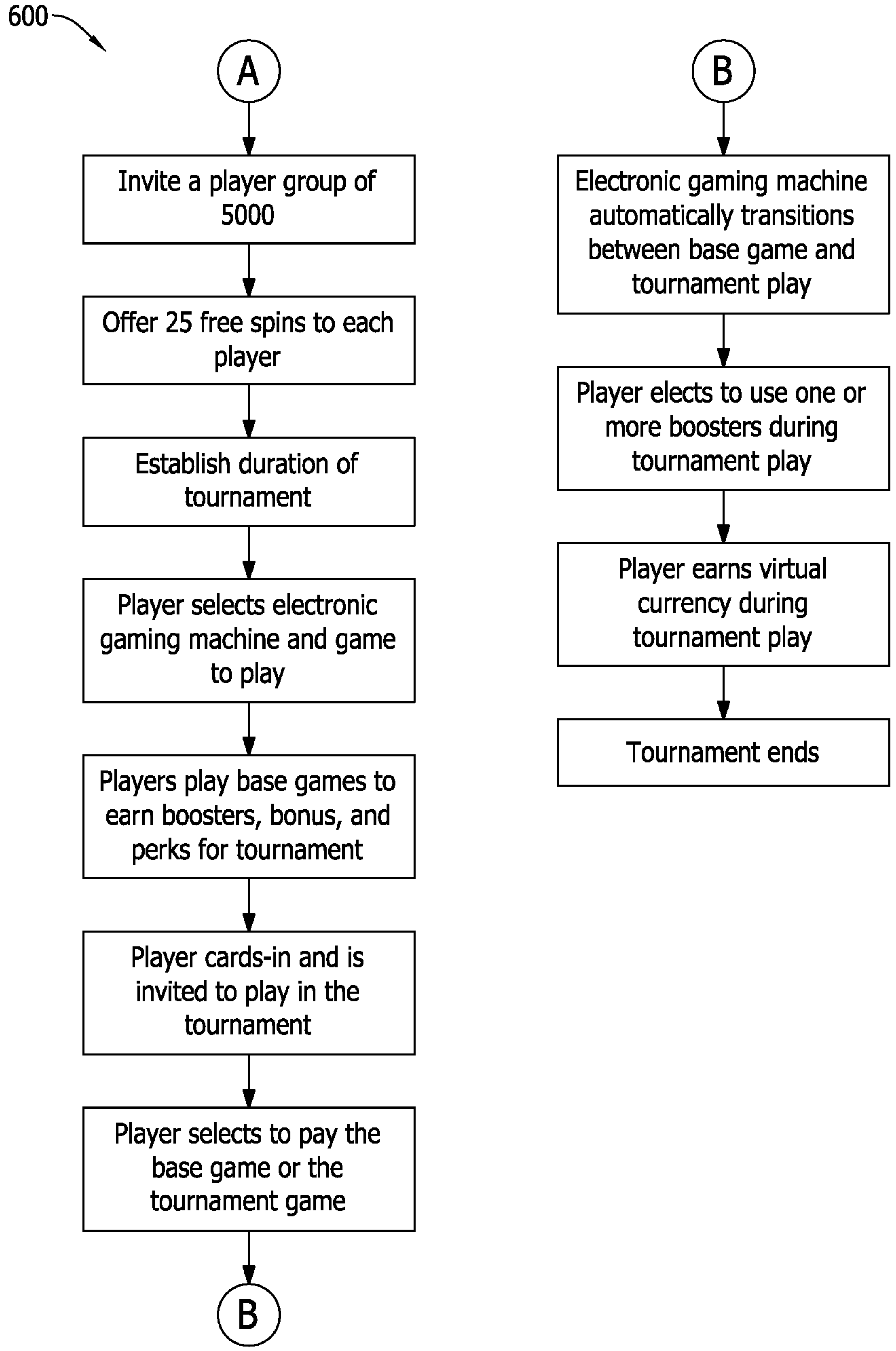
FIG. 6 is a flow diagram of an exemplary method of conducting a tournament the electronic gaming machines shown in FIGS. 1 and 2.

FIG. 6 is a flow diagram of an exemplary method 600 of a method of conducting a persistent wagering game tournament on a gaming system. The gaming system including a plurality of electronic gaming machines, such as gaming machines 100, 200, or 400, shown in FIGS. 1, 2, 4, and 5.

The wagering game tournament is initiated by issuing 602 invitations to a player group to participate in the wagering game tournament. Invitations may be delivered through various means available to a given gaming establishment, including, for example, email, via player accounts, mail, or during play of another wagering game in the gaming establishment. The gaming establishment may issue 602 the invitations to a player group of varying size. For example, in one embodiment, invitations are issued 602 to 5000 players, at least some of which will not respond, and at least some of which will participate in the wagering game tournament. Each player in the player group is offered 604 a plurality of free rounds of play in the wagering game tournament. For example, in the exemplary embodiment, each player is offered 25 free spins in the wagering game tournament, where the tournament is limited to, for example, reel games.

Figure 7:
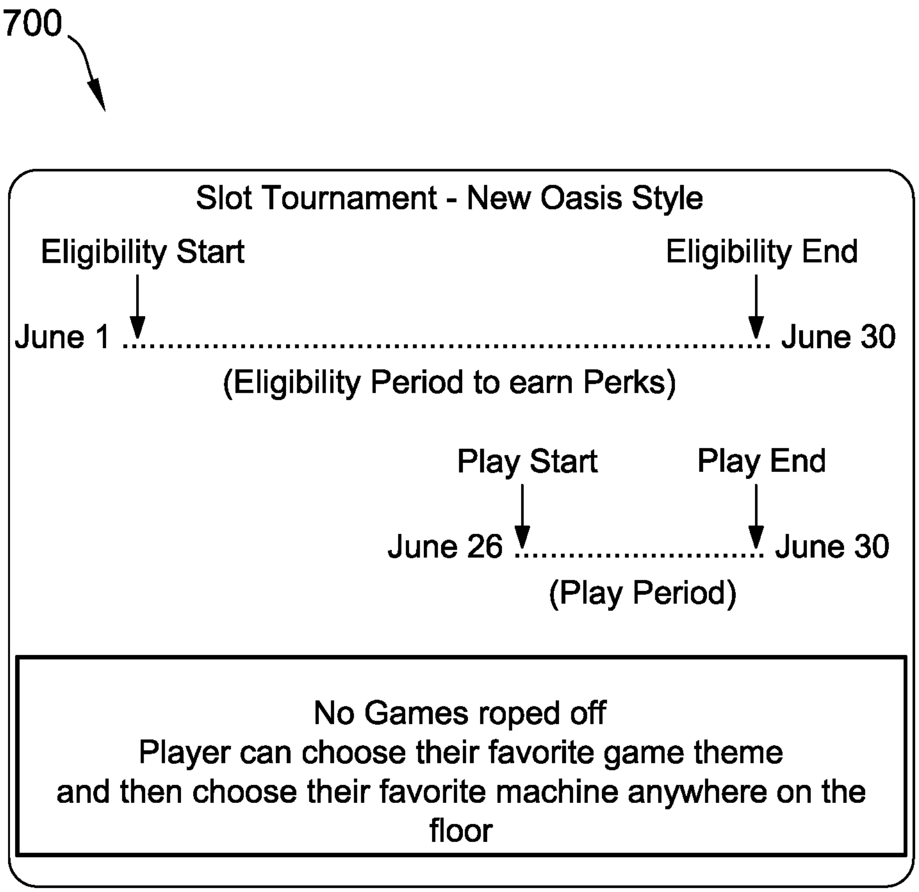
FIG. 7 is an illustrative diagram of a base game and tournament timeline.
Figure 8:
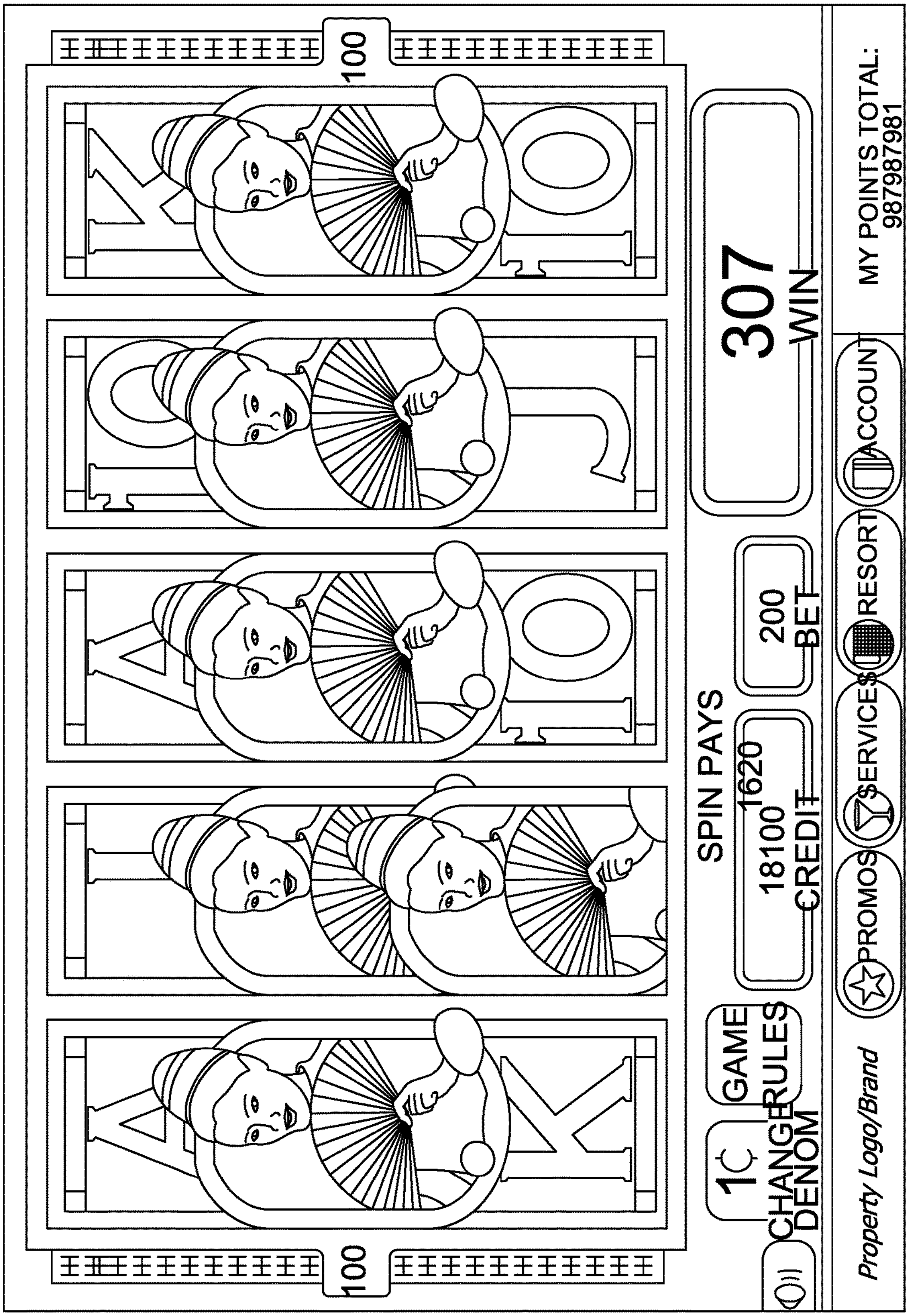
FIG. 8 is an illustration of a player interface for a base game without tournament access.
Figure 9:
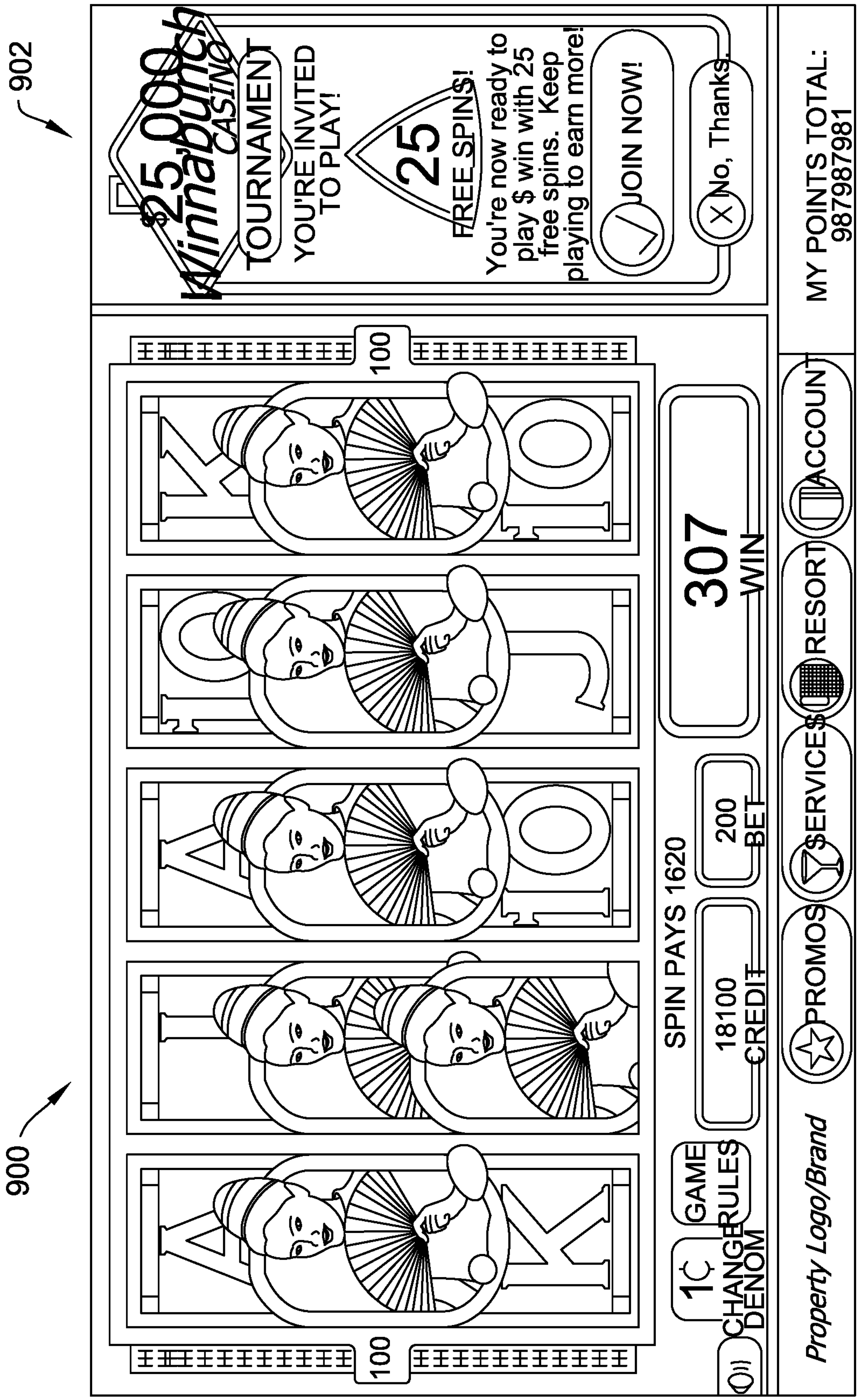
FIG. 9 is an illustration of a player interface including an invitation to tournament play.
Figure 10:
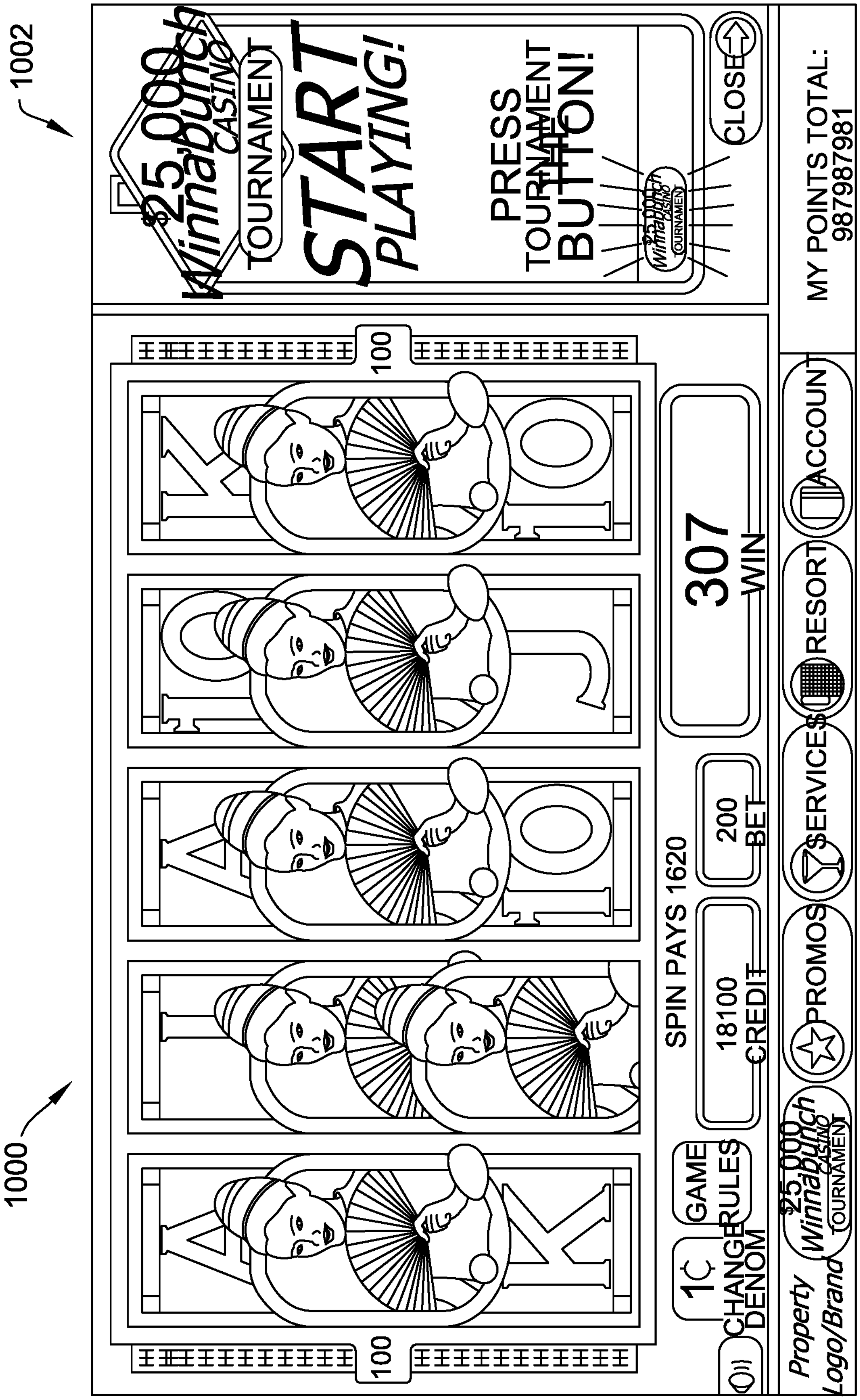
FIG. 10 is an illustration of a player interface including a prompt to begin tournament play.
Figure 11:
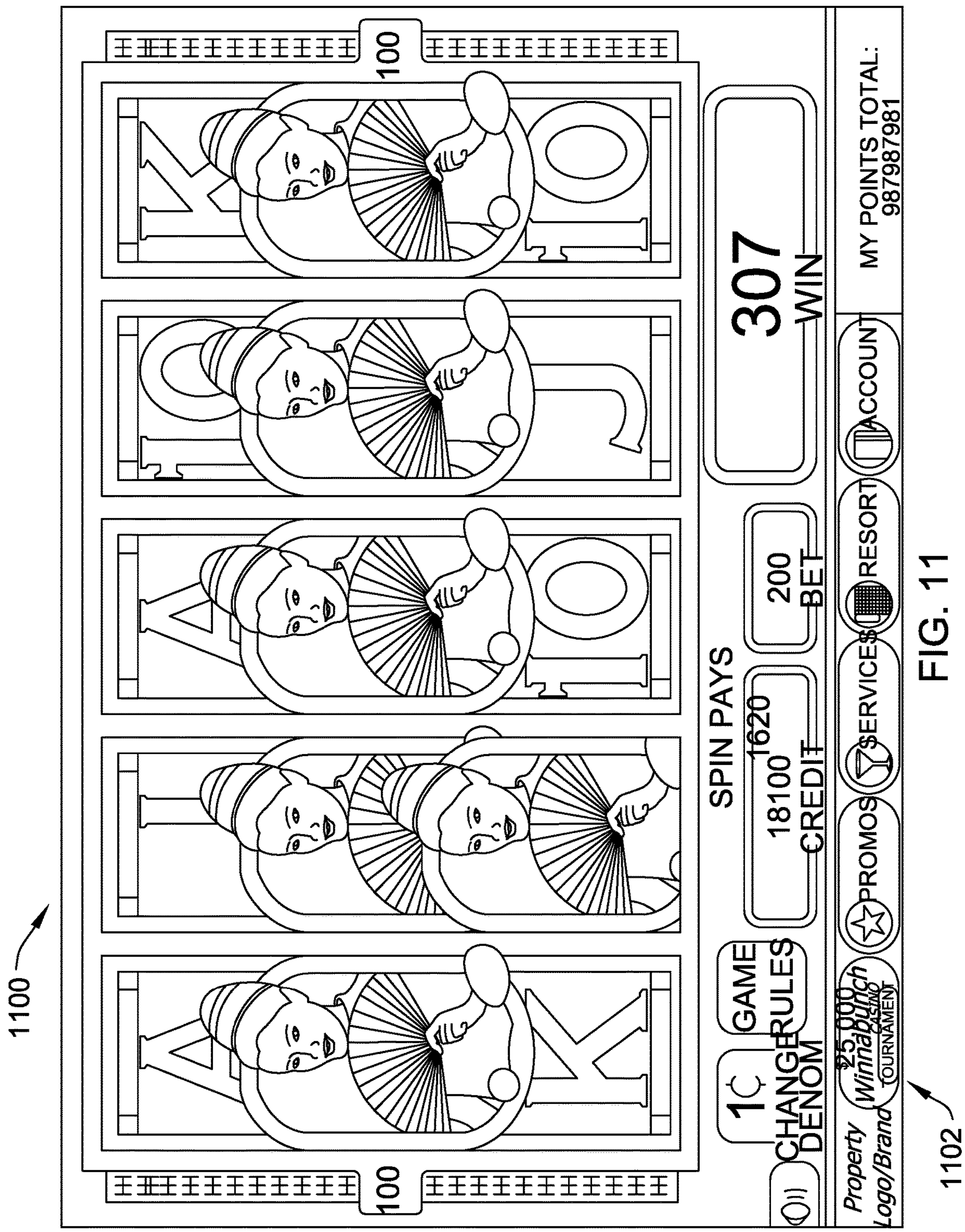
FIG. 11 is an illustration of a player interface including base game play with a tournament button.
Figure 12:
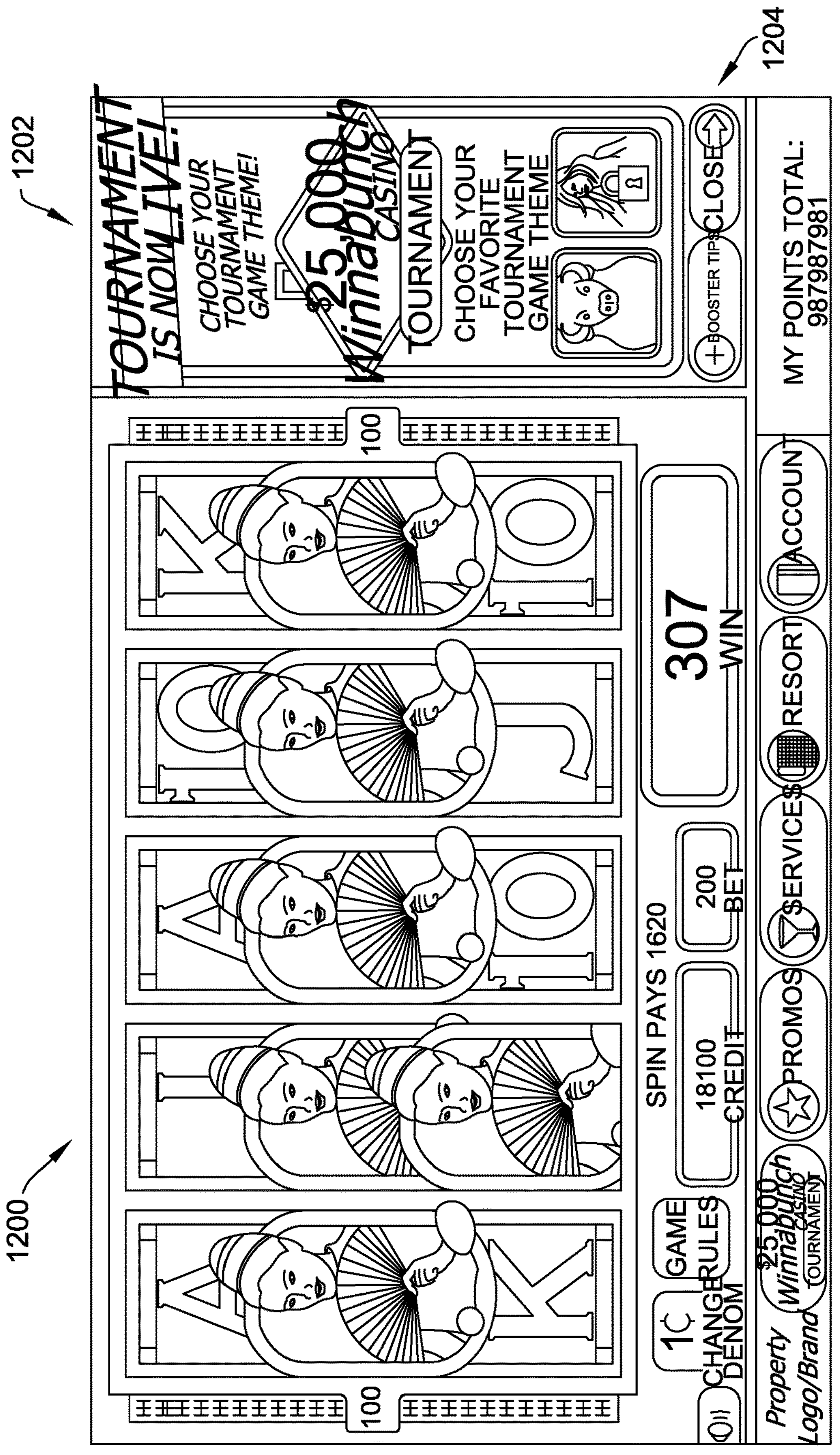
FIG. 12 is an illustration of a player interface including a player prompt to select a game theme.
Figure 13:
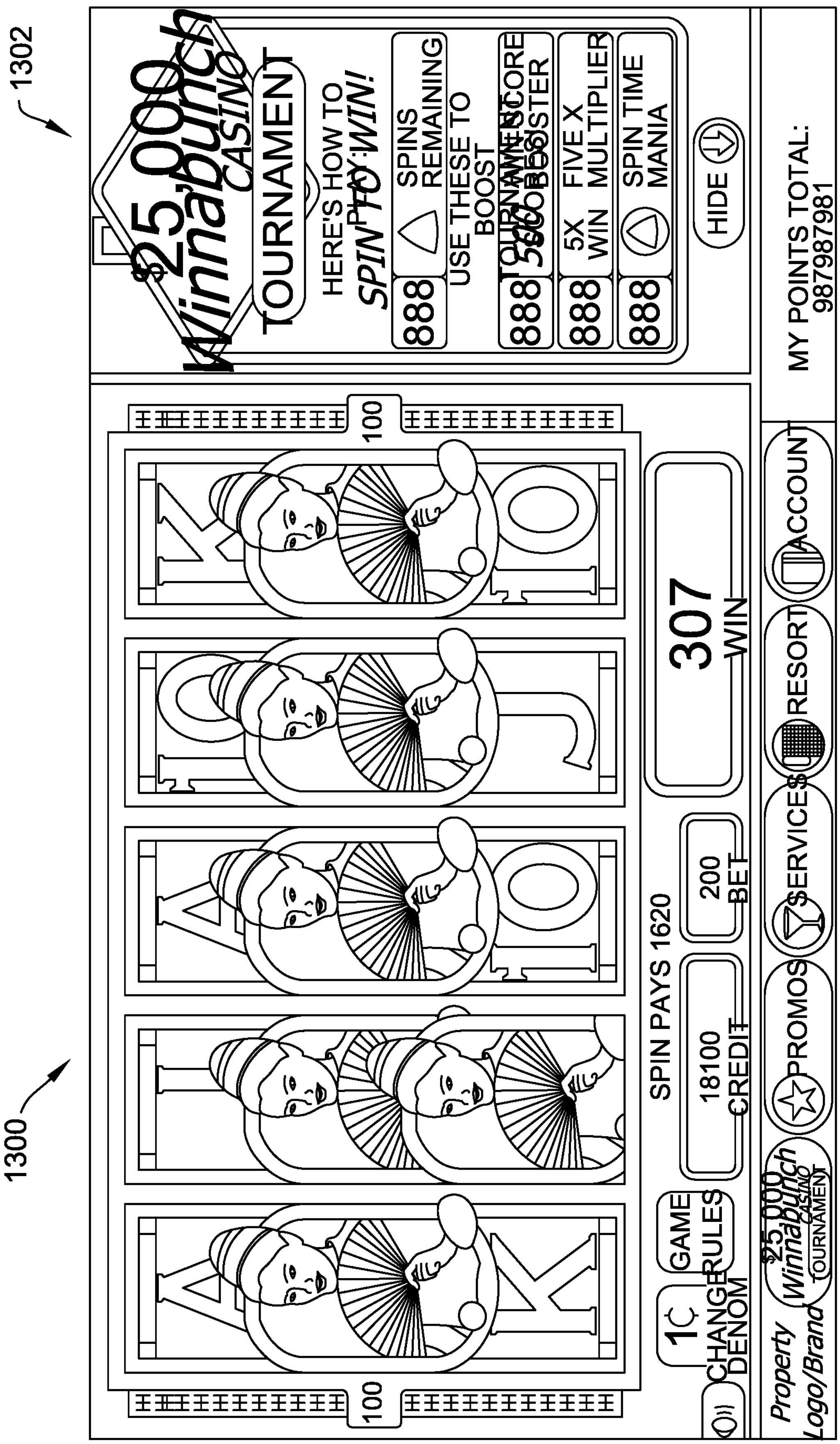
FIG. 13 is an illustration of a player interface including tips on how to play boosters in the tournament.

The wagering game tournament generally has a limited duration. FIG. 7 illustrates an exemplary wagering game tournament timeline 700 that defines time windows in which players may become eligible for the wagering game tournament as well as time windows for participating in the wagering game tournament. The gaming establishment establishes 606 the duration of the wagering game tournament, during which players may elect to participate in the wagering game tournament.

FIGS. 8-18 are exemplary game displays a given electronic gaming machine may display during the course of conducting the persistent wagering game tournament. A given player selects 608 which electronic gaming machine he or she wishes to play, and is not limited to a particular set or bank of electronic gaming machines. Moreover, the player selects 608 which game to play from among a plurality of games available to the player. Generally, the player is able to gain access to, or unlock, certain games based on their wagering activity. For example, as the player's wagers exceed a given threshold, the electronic gaming machine may make certain games available that have higher payouts, increased RTP, improved perks, and higher bonus availability. In another example (e.g., where one or more games are unlocked, as described herein), the electronic gaming machine may grant access to an increasing number or quantity of games (e.g., tournament games) as a past or historical wagering activity of a player increases (e.g., as the player's individual wagers increase and/or the total amount wagered increases). The player then participates in a base wagering game, such as game display 800 shown in FIG. 8, based on monetary currency. During play 610 of the base wagering game, the player may earn boosters, bonuses, or other perks for use in the wagering game tournament.

Figure 14:
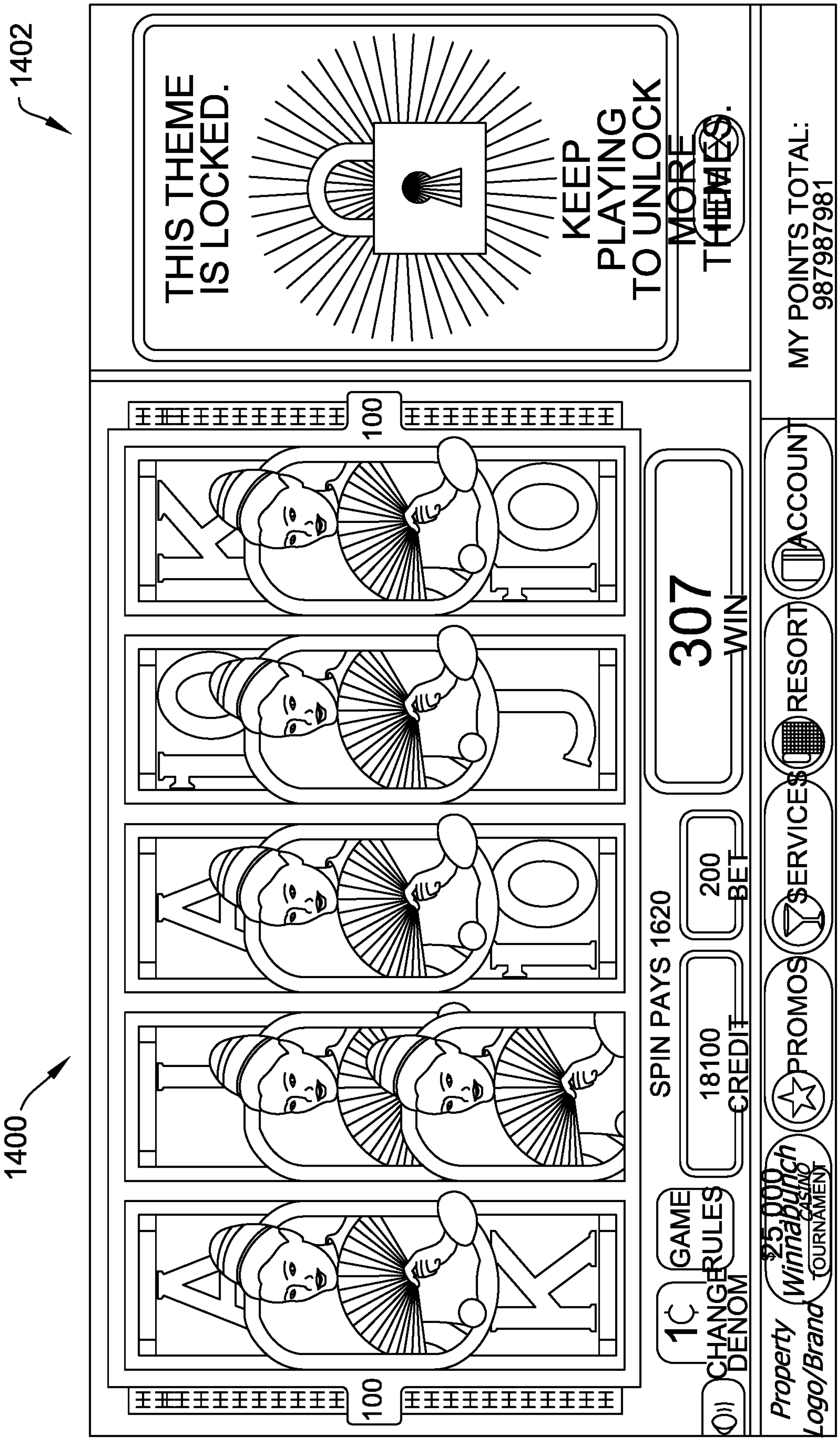
FIG. 14 is an illustration of a player interface including an indicator that a game theme is unavailable to the player.
Figure 15:
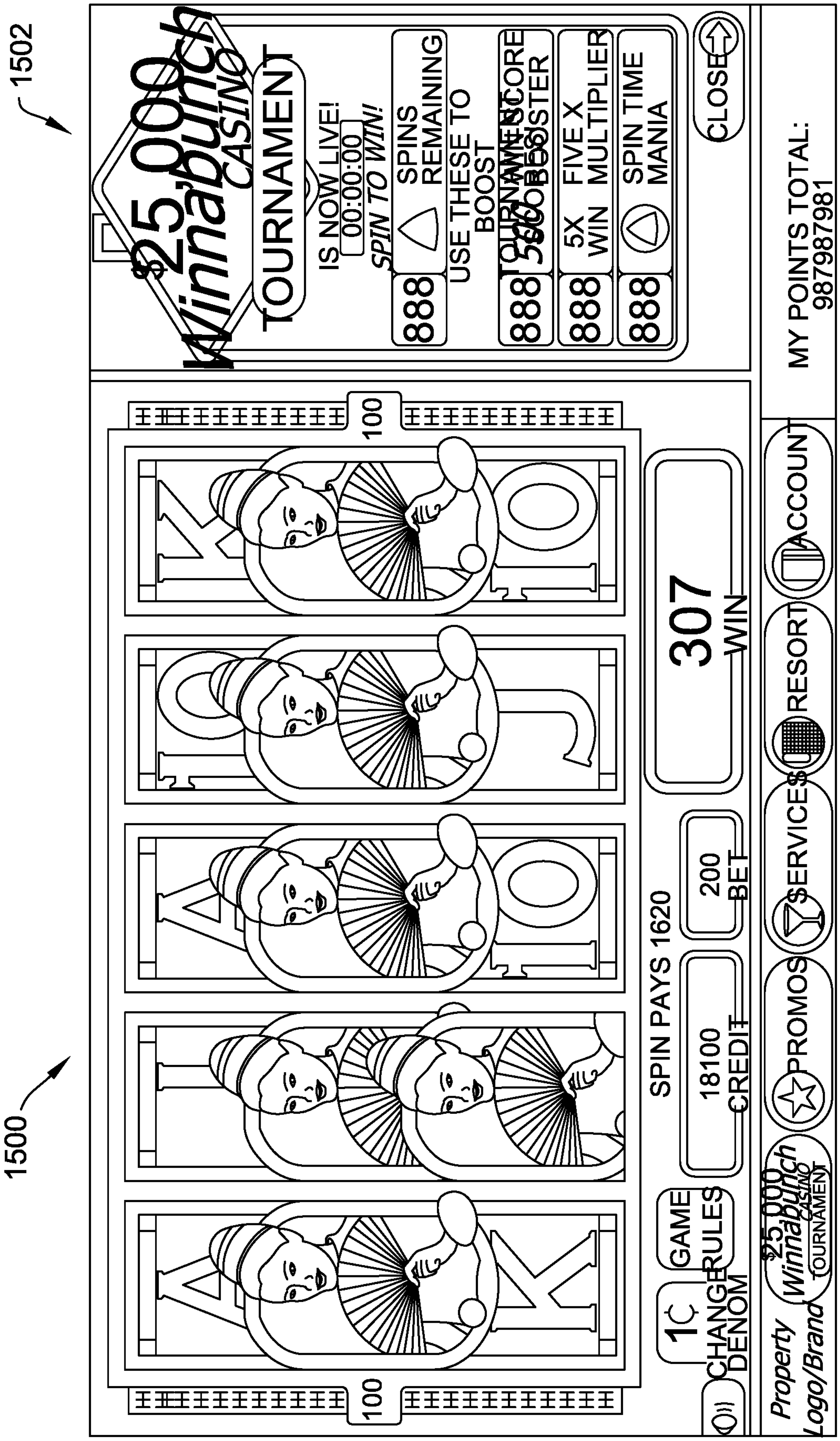
FIG. 15 is an illustration of a player interface including a reminder to begin tournament play.

Before or during play 610 of the base wagering game on the selected electronic gaming machine, the player "cards-in" 612 to the player's player tracking account to which the invitation to the wagering game tournament is associated. The player is then presented an option to transition to the wagering game tournament. For example, as shown in game display 900 in FIG. 9, an invitation panel 902 enables a player selection to join the wagering game tournament. The player then selects 614 whether to participate in the base wagering game or the wagering game tournament. For example, game display 1000 shown in FIG. 10 includes a selection panel 1002 that enables the player to freely transition between the base wagering game and the wagering game tournament. In an alternative embodiment, game display 1100 shown in FIG. 11, for example, includes a selection banner 1102 near the bottom of game display 1100 that enables the player to freely transition between the base wagering game and the wagering game tournament. The electronic gaming machine automatically transitions 616 between the base wagering game and the wagering game tournament in response to the player's selection 614. Upon transitioning to the wagering game tournament, the player is again presented an option to select 608 a game from among a plurality of games available for the wagering game tournament. For example, game display 1200 shown in FIG. 12 includes a game selection panel 1202 that presents the player a plurality of game options 1204. In certain embodiments, the player may gain access to additional games that offer improved RTP, higher payouts, better pay tables, additional bonus opportunities for play in the wagering game tournament. For example, FIG. 14 is a game display 1400 including a prompt 1402 that reminds the player that additional games may become available as the player continues to wager.

Figure 16:
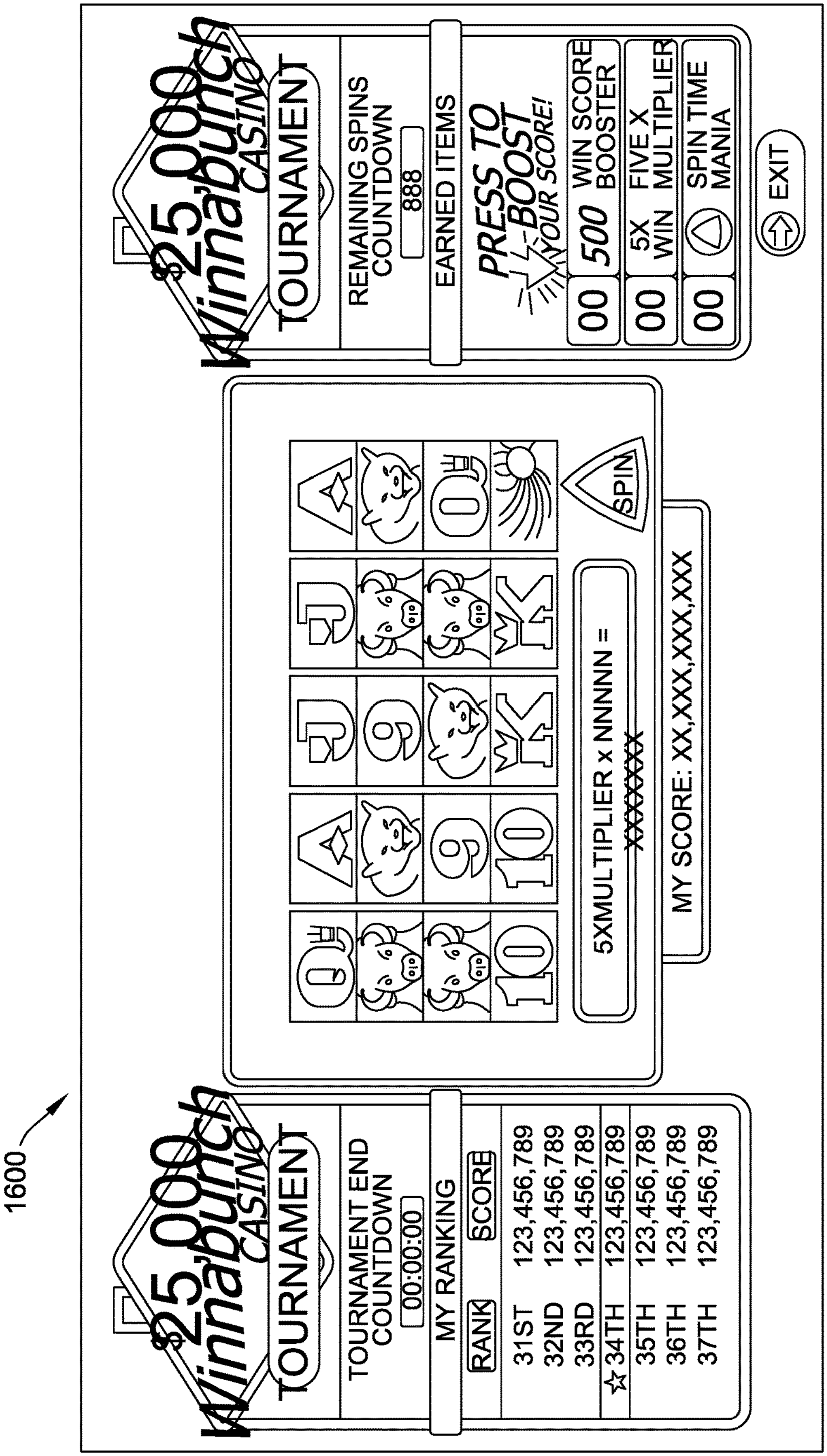
FIG. 16 is an illustration of a player interface for a tournament game.
Figure 17:
FIG. 17 is an illustration of a leaderboard for a tournament.
Figure 18:
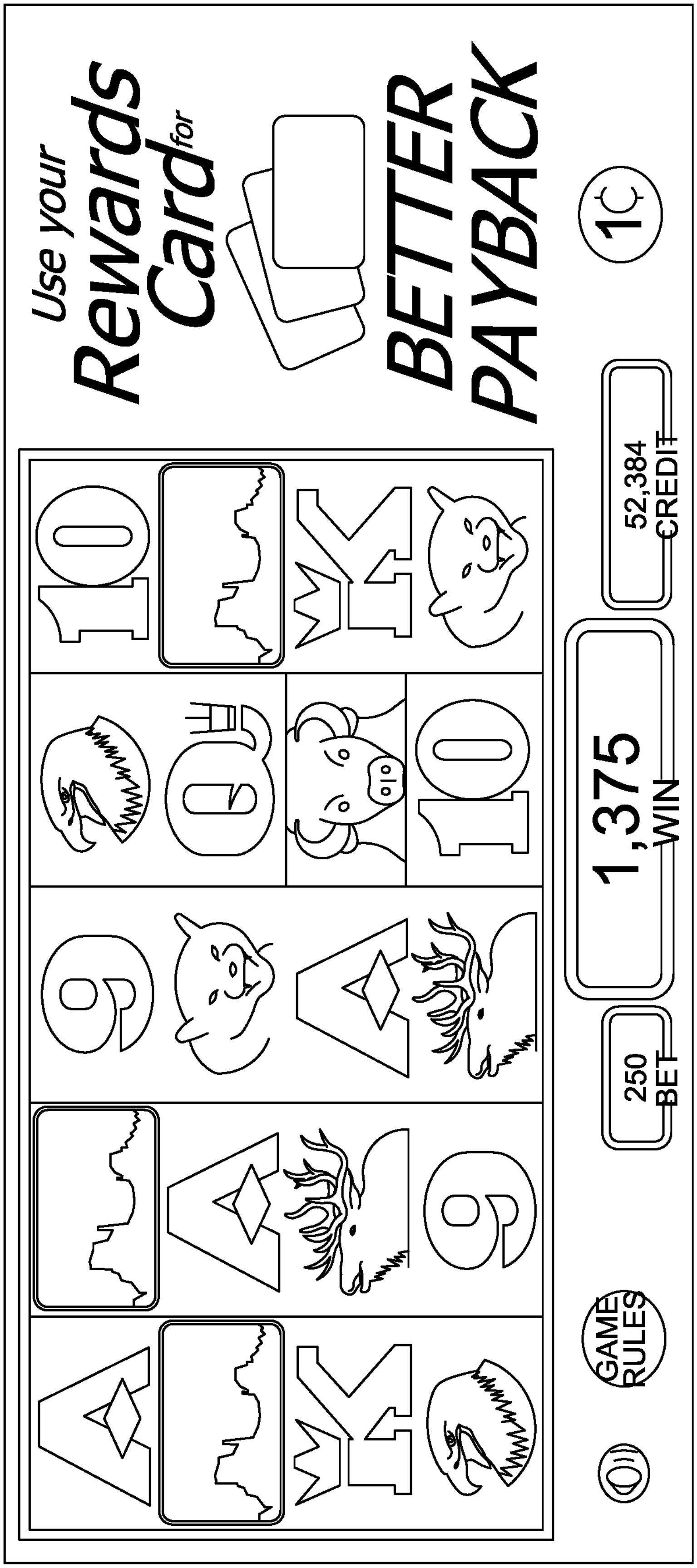
FIG. 18 is an illustration of a player interface for a multi-game system in which games provide varying levels of RTP.

When the player selects 614 to participate in the wagering game tournament, the player may select 618 one or more boosters, bonuses, or other perks to use during play of the wagering game tournament. Game display 1300 shown in FIG. 13, for example, includes a perks panel 1302 that enables player selection of one or more boosters, bonuses, or other perks for use during the wagering game tournament. In an alternative embodiment, a game display 1500, shown in FIG. 15, includes another perks panel 1502 that further includes an indicator that the wagering game tournament has begun. Further, as the player participates in the wagering game tournament, the player earns 620 virtual currency. FIG. 16 is an exemplary game display 1600 for conducting a selected game in the wagering game tournament. FIG. 17 is another exemplary game display 1700 including a leaderboard for the wagering game tournament. FIG. 18 is another exemplary game display 1800 including a prompt to remind players to card-in to enhance their return in the base wagering game and the wagering game tournament. The player may continue to select 614 to participate in the base wagering game or the wagering game tournament until the tournament ends 622 based on the established wagering game tournament duration.

Exemplary technical effects of the systems, methods, and apparatus described herein include at least one of: (a) brining specific players to casinos; (b) rewarding key players; (c) increasing revenue for casinos; (d) eliminating the need to make banks of electronic gaming machines unavailable to the public for a tournament; (e) automating transitions between revenue play, i.e., base game, and out-of-revenue play, i.e., tournament play; (f) increasing revenue play by players desiring to earn tournament boosters, bonuses, and other perks; (g) enabling player discretion on when to play a base game and when to play in a tournament; (h) enabling indefinite tournament durations; (i) providing a more engaging tournament game play experience; and (j) enabling player selection of electronic gaming machines and games on which tournaments are played.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Although the present disclosure is described in connection with an exemplary gaming system environment, embodiments of the present disclosure are operational with numerous other general purpose or special purpose gaming system environments or configurations. The gaming system environment is not intended to suggest any limitation as to the scope of use or functionality of any aspect of the disclosure. Moreover, the gaming system environment should not be interpreted as having any dependency or requirement relating to any one or combination of components illustrated in the exemplary operating environment.

Embodiments of the present disclosure may be described in the general context of computer-executable instructions, such as program components or modules, executed by one or more computers or other devices. Aspects of the present disclosure may be implemented with any number and organization of components or modules. For example, aspects of the present disclosure are not limited to the specific computer-executable instructions or the specific components or modules illustrated in the figures and described herein. Alternative embodiments of the present disclosure may include different computer-executable instructions or components having more or less functionality than illustrated and described herein.

The order of execution or performance of the operations in the embodiments of the present disclosure illustrated and described herein is not essential, unless otherwise specified.

That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

The present disclosure uses examples to disclose the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electronic gaming device comprising:

at least one display device comprising a graphical user interface (GUI);

at least one memory with instructions stored thereon; and at least one processor in communication with the at least one memory and communicatively coupled with at least one display device via a network, wherein the instructions, when executed by the at least one processor, cause the at least one processor to:

store, within the at least one memory, a list of a plurality of subgames hosted by a game platform device, the list of the plurality of subgames including an ordinal ranking of each of the plurality of subgames by a configurable parameter of the subgame and a predesignated value of a player account parameter;

retrieve default game data to initiate play of a default game on the electronic gaming device;

cause display of the default game on the at least one display device by processing (i) the default game data, and (ii) default game configuration data stored within the at least one memory of the electronic gaming device;

identify a player account for a game session at the electronic gaming device in response to receiving an electronic input based on a player initiating the game session at the electronic gaming device;

perform a lookup within the at least one memory to determine a value of a player account parameter associated with the identified player account;

perform a lookup within the list of plurality of subgames stored within the at least one memory to determine a subgame of the plurality of subgames hosted by the game platform device to make available during the game session based on the value of the player account parameter associated with the player account and the ordinal ranking of the plurality of subgames by the predesignated value of the player account parameter;

during play of the default game on the electronic gaming device, cause display of a first virtual button associated with the subgame on the at least one display device, wherein a selection of the first virtual button causes (i) the default game to be terminated, and (ii) a first message to be transmitted to the game platform device requesting that the subgame data be communicated to the electronic gaming device so the subgame can be played on the electronic gaming device;

in response to the selection of the first virtual button, cause a second virtual button associated with the default game and the subgame to be displayed on the at least one display device; and based on selection of the second virtual button:

cause a second message to be sent to the game platform device terminating the subgame;

cause game play data associated with a status of the subgame to be stored at the game platform device; and cause display of the default game and the first virtual button on the at least one display device, wherein based on a next selection of the first virtual button during the gaming session, the subgame is resumed based on the game play data associated with the status of the subgame stored at the game platform device.

2. The electronic gaming device of claim 1, wherein the instructions further cause the at least one processor to determine the subgame of the plurality of subgames based on a message from a gaming server.

3. The electronic gaming device of claim 1, wherein the player account parameter comprises at least one of a wager amount, a credit balance, a loyalty club membership, or a loyalty club tier.

4. The electronic gaming device of claim 1, wherein the game play data associated with the status of the subgame comprises a number of spins remaining in the subgame.

5. The electronic gaming device of claim 1, wherein the instructions further cause the at least one processor to:

track play of the default game;

update the value of the player account parameter to an updated value based on the tracked play of the default game; and provide access to another subgame of the plurality of subgames based on the updated value of the player account parameter.

6. The electronic gaming device of claim 1, wherein outcomes associated with the subgame are determined based on the configurable parameter associated with the subgame, wherein the configurable parameter comprises a return to player (RTP).

7. At least one non-transitory computer-readable storage medium (CRM) with instructions stored thereon that, in response to execution by at least one processor of an electronic gaming device, cause the at least one processor to:

store, within at least one memory, a list of a plurality of subgames hosted by a game platform device, the list of the plurality of subgames including an ordinal ranking of each of the plurality of subgames by a configurable parameter of the subgame and a predesignated value of a player account parameter;

retrieve default game data to initiate play of a default game on the electronic gaming device;

control display of the default game on at least one display device of the electronic gaming device by processing (i) the default game data, and (ii) default game configuration data stored within the at least one memory, wherein the at least one display device is communicatively coupled with the at least one processor of the electronic gaming device via a network:

determine a player account associated with a game session at the electronic gaming device in response to receiving an electronic input based on a player initiating the game session at the electronic gaming device;

perform a lookup within the at least one memory to determine a value of a player account parameter associated with the determined player account;

perform a lookup within the list of plurality of subgames stored within the at least one memory to identify a subgame of the plurality of subgames hosted by the game platform device to make available during the game session based on an amount corresponding to the predesignated value of the player account parameter associated with the player account and the ordinal ranking of the plurality of subgames by the predesignated amount value of the player account parameter;

during play of the default game on the electronic gaming device, control display of a first virtual button associated with the subgame on the at least one display device, wherein a selection of the first virtual button causes (i) the default game to be terminated, and (ii) a first message to be transmitted to the game platform device requesting that the subgame data be communicated to the electronic gaming device so the subgame can be played on the electronic gaming device;

in response to the selection of the first virtual button, control a second virtual button associated with the default game and the subgame to be displayed on the at least one display device; and based on selection of the second virtual button:

cause a second message to be sent to the game platform device terminating the subgame;

control game play data associated with progress of the subgame to be stored at the game platform device; and control display of the default game and the first virtual button on the at least one display device, wherein based on a next selection of the first virtual button during the gaming session, the subgame is continued based on the game play data associated with the progress of the subgame stored at the game platform device.

8. The at least one non-transitory computer-readable storage medium of claim 7, wherein the instructions further cause the at least one processor to identify the subgame of the plurality of subgames based on a message from a gaming server.

9. The at least one non-transitory computer-readable storage medium of claim 7, wherein the player account parameter comprises at least one of a wager amount, a credit balance, a loyalty club membership, or a loyalty club tier.

10. The at least one non-transitory computer-readable storage medium of claim 7, wherein the game play data associated with the progress of the subgame comprises a number of spins remaining in the subgame.

11. The at least one non-transitory computer-readable storage medium of claim 7, wherein the instructions further cause the at least one processor to:

record game outcomes associated with plays of the default game;

update the amount of the player account parameter to an updated amount based on the recorded game outcomes; and provide access to another subgame of the plurality of subgames based on the updated amount of the player account parameter.

12. The at least one non-transitory computer-readable storage medium of claim 7, wherein outcomes associated with the subgame are determined based on the configurable parameter associated with the subgame, wherein the configurable parameter comprises a return to player (RTP).

13. A computer-implemented method performed by an electronic gaming device including at least one memory with instructions stored thereon and at least one processor in communication with the at least one memory and communicatively coupled with at least one display device of the electronic gaming device via a network, the method comprising:

storing, within the at least one memory, a list of a plurality of subgames hosted by a game platform device, the list of the plurality of subgames including an ordinal ranking of each of the plurality of subgames by a configurable parameter of the subgame and a predesignated value of a player account parameter;

retrieving default game data to initiate play of a default game on the electronic gaming device;

causing display of the default game on the at least one display device by processing (i) the default game data, and (ii) default game configuration data stored within the at least one memory of the electronic gaming device;

selecting player account for a game session in response to receiving an electronic input based on a player initiating the game session at the electronic gaming device;

performing a lookup within the at least one memory to determine a value of a player account parameter associated with the selected player account;

performing a lookup within the list of plurality of subgames stored within the at least one memory to select a subgame of the plurality of subgames hosted by the game platform device for use during the game session based on the value of the player account parameter associated with the player account and the ordinal ranking of the plurality of subgames by the predesignated value of the player account parameter;

during play of the default game on the electronic gaming device, causing display of a first virtual button associated with the subgame on the at least one display device, wherein a selection of the first virtual button causes (i) the default game to be terminated, and (ii) a first message to be transmitted to the game platform device requesting that the subgame data be communicated to the electronic gaming device so the subgame can be played on the electronic gaming device;

in response to the selection of the first virtual button, causing second virtual button associated with the default game and the subgame to be displayed on the at least one display device; and in response to selection of the second virtual button:

causing a second message to be sent to the game platform device terminating the subgame;

causing game play data associated with a status of the subgame to be stored at the game platform device; and causing display of the default game and the first virtual button on the at least one display device, wherein based on a next selection of the first virtual button during the gaming session, the subgame is resumed based on the game play data associated with the status of the subgame stored at the game platform device.

14. The method of claim 13, further comprising selecting the subgame of the plurality of subgames based on a message from a gaming server.

15. The method of claim 13, wherein the player account parameter comprises at least one of a wager amount, a credit balance, a loyalty club membership, or a loyalty club tier.

16. The method of claim 13, further comprising:

identifying plays of the default game during the game session;

updating the value of the player account parameter to an updated value based on the identified plays of the default game; and providing access to another subgame of the plurality of subgames based on the updated value of the player account parameter.

17. The method of claim 13, wherein outcomes associated with the subgame are selected based on the configurable parameter associated with the subgame, wherein the configurable parameter comprises a return to player (RTP).

* * * * *